(12) United States Patent
Muñoz Sotoca

(10) Patent No.: US 11,897,730 B1
(45) Date of Patent: Feb. 13, 2024

(54) FRICTIONLESS SAFETY BRAKE ACTUATOR

(71) Applicant: Otis Elevator Company, Farmington, CT (US)

(72) Inventor: Javier Muñoz Sotoca, Madrid (ES)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 17/987,562

(22) Filed: Nov. 15, 2022

(30) Foreign Application Priority Data

Aug. 31, 2022 (EP) ..................................... 22382814

(51) Int. Cl.
| | | |
|---|---|---|
| B66B 5/18 | (2006.01) | |
| F16D 59/00 | (2006.01) | |
| F16D 65/18 | (2006.01) | |
| H02P 15/00 | (2006.01) | |
| F16D 121/22 | (2012.01) | |
| H02K 33/02 | (2006.01) | |

(52) U.S. Cl.
CPC ................ B66B 5/18 (2013.01); F16D 59/00 (2013.01); F16D 65/18 (2013.01); H02P 15/00 (2013.01); F16D 2121/22 (2013.01); H02K 33/02 (2013.01)

(58) Field of Classification Search
CPC . B66B 5/18; F16D 59/00; F16D 65/18; F16D 2121/22; F16D 59/02; H02K 49/065; H02K 33/02; H02K 41/02; H02P 15/00
See application file for complete search history.

(56) References Cited

U.S. PATENT DOCUMENTS

| | | | | |
|---|---|---|---|---|
| 5,791,442 | A * | 8/1998 | Arnold ..................... | H01F 5/00 |
| | | | | 188/164 |
| 10,584,014 | B2 * | 3/2020 | Fauconnet ................ | B66B 5/22 |
| 10,822,200 | B2 * | 11/2020 | Dube ........................ | B66B 5/18 |
| 11,084,690 | B2 * | 8/2021 | Hakala ................... | B66B 1/3476 |
| 11,407,617 | B2 * | 8/2022 | Bhaskar ................. | B66B 7/022 |
| 2003/0193247 | A1 * | 10/2003 | Delaire .................. | H02K 33/02 |
| | | | | 310/14 |
| 2015/0259175 | A1 * | 9/2015 | West ..................... | F16D 63/008 |
| | | | | 187/359 |
| 2017/0283216 | A1 * | 10/2017 | Marvin ................... | B66B 5/044 |
| 2018/0222718 | A1 * | 8/2018 | Khzouz .................... | B66B 5/18 |
| 2018/0327224 | A1 * | 11/2018 | Billard ..................... | B66B 5/22 |
| 2019/0177124 | A1 * | 6/2019 | Billard .................... | B66B 7/046 |
| 2019/0248627 | A1 * | 8/2019 | Munoz ..................... | B66B 5/18 |
| 2019/0352127 | A1 * | 11/2019 | Billard ...................... | B66B 5/18 |
| 2020/0283267 | A1 * | 9/2020 | Lindström .............. | F16D 49/00 |

* cited by examiner

Primary Examiner — Michael R Mansen
Assistant Examiner — Michelle M Lantrip
(74) Attorney, Agent, or Firm — CANTOR COLBURN LLP

(57) ABSTRACT

A frictionless safety brake actuator, for use in an elevator system, includes at least two stators; a magnet array positioned between the stators; a linkage attached to the magnet array; and a biasing arrangement. The linkage is actuatable to move a safety brake into frictional engagement with an elevator guide rail. The magnet array is moveable between a first position in which the linkage is actuated and a second position in which the linkage is not actuated. The biasing arrangement is arranged to bias the magnet array towards the first position. The magnet array includes a first magnet set and a second magnet set which comprise at least one magnet each and at least three magnets in total. The magnet(s) of the first magnet set is/are arranged alternately with the magnet(s) of the second magnet set in a stack.

15 Claims, 12 Drawing Sheets

US 11,897,730 B1

FRICTIONLESS SAFETY BRAKE ACTUATOR

FOREIGN PRIORITY

This application claims priority to European Patent Application No. 22382814.6, filed Aug. 31, 2022, and all the benefits accruing therefrom under 35 U.S.C. § 119, the contents of which in its entirety are herein incorporated by reference.

TECHNICAL FIELD

The present disclosure relates to frictionless safety brake actuators for use in an elevator system, and to elevator systems comprising such frictionless safety brake actuators.

BACKGROUND

It is known in the art to mount safety brakes onto elevator components moving along guide rails, to bring the elevator component quickly and safely to a stop, especially in an emergency. In many elevator systems the elevator car is hoisted by a tension member with its movement being guided by a pair of guide rails. Typically, a governor is used to monitor the speed of the elevator car. According to standard safety regulations, such elevator systems must include an emergency braking device (known as a safety brake, "safety gear" or "safety") which is capable of stopping the elevator car from moving upwards or downwards, even if the tension member breaks, by gripping a guide rail. Safety brakes may also be installed on the counterweight or other components moving along guide rails.

Electronic Safety Actuators (ESA's) are now commonly used instead of using mechanical governors to trigger a safety brake, e.g. using electronic or electrical control. ESA's typically activate a safety brake by controlled release of a magnet (either a permanent magnet or an electromagnet) to drag against the guide rail, and using the friction resultant therefrom to pull up on a linkage attached to the safety brake. The reliance on the friction interaction between a magnet and the guide rail has a number of potential complexities, especially in high-rise elevator systems, as the interaction between the magnet and the guide rail causes wear on the guide rail, and can induce chipping, as well as debris accumulation.

To address these and other issues, frictionless safety brake actuators may be used. In frictionless safety brake actuators, a different mechanism other than a friction interaction between a magnet and the guide rail is used to actuate the safety brake. For example, in some frictionless safety brake actuators, a spring force is controlled to pull on a linkage that engages a safety brake. However, after the safety brake has been engaged, the frictionless safety brake actuator needs to be reset to return the linkage and the safety brake to their non-actuated positions.

There is a need to provide a reliable and convenient reset mechanism for such frictionless safety brake actuators.

SUMMARY

When viewed from a first aspect, the disclosure provides a frictionless safety brake actuator for use in an elevator system, comprising: at least two stators, including a first stator and a second stator extending in respective substantially parallel planes; a magnet array positioned between the first and second stators; a linkage that is actuatable so as to move a safety brake into frictional engagement with an elevator guide rail, wherein the linkage is attached to the magnet array, and wherein the magnet array is moveable along an axis extending substantially parallel to the first and second stators between a first position in which the linkage is actuated and a second position in which the linkage is not actuated; and a biasing arrangement arranged to apply a biasing force to the magnet array to bias the magnet array towards the first position; wherein the magnet array comprises a first magnet set and a second magnet set, wherein the first and second magnet sets comprise at least one magnet each and at least three magnets in total, wherein the magnet(s) of the first magnet set is/are arranged alternately with the magnet(s) of the second magnet set in a stack, wherein the or each magnet in the first magnet set is an electromagnet, and wherein the magnet array produces a magnetic field; wherein the electromagnet(s) in the first magnet set and the magnet(s) in the second magnet set each have a respective orientation such that when a forward current is supplied to the electromagnet(s) in the first magnet set, the magnetic field is stronger on a first side of the magnet array adjacent to the first stator than on a second, opposing side of the magnet array adjacent to the second stator, and when a reverse current is supplied to the electromagnet(s) in the first magnet set, the magnetic field is stronger on the second side of the magnet array than on the first side of the magnet array; wherein the first and second stators each comprise a respective array of discrete magnetic elements that extends parallel to the axis, wherein the discrete magnetic elements have a staggered configuration in which the discrete magnetic elements on the first stator are displaced in the direction of the axis relative to the discrete magnetic elements on the second stator.

This aspect of the disclosure extends to an elevator system comprising an elevator guide rail, an elevator car, a frictionless safety brake actuator and a safety brake, wherein the frictionless safety brake actuator and the safety brake are mounted to the elevator car to move along the guide rail with the elevator car in use; wherein the frictionless safety brake actuator comprises: at least two stators, including a first stator and a second stator extending in respective substantially parallel planes; a magnet array positioned between the first and second stators; a linkage that is actuatable so as to move the safety brake into frictional engagement with the elevator guide rail, wherein the linkage is attached to the magnet array, and wherein the magnet array is moveable along an axis extending substantially parallel to the first and second stators between a first position in which the linkage is actuated and a second position in which the linkage is not actuated; and a biasing arrangement arranged to apply a biasing force to the magnet array to bias the magnet array towards the first position; wherein the magnet array comprises a first magnet set and a second magnet set, wherein the first and second magnet sets comprise at least one magnet each and at least three magnets in total, wherein the magnet(s) of the first magnet set is/are arranged alternately with the magnet(s) of the second magnet set in a stack, wherein the or each magnet in the first magnet set is an electromagnet, and wherein the magnet array produces a magnetic field; wherein the electromagnet(s) in the first magnet set and the magnet(s) in the second magnet set each have a respective orientation such that when a forward current is supplied to the electromagnet(s) in the first magnet set, the magnetic field is stronger on a first side of the magnet array adjacent to the first stator than on a second, opposing side of the magnet array adjacent to the second stator, and when a reverse current is supplied to the electromagnet(s) in the first magnet set, the magnetic field is stronger on the second side of the magnet array than on the first side of the magnet array; wherein the first and second stators each comprise a respective array of discrete magnetic elements that extends parallel to the axis, wherein the discrete magnetic elements have a staggered configuration in which the discrete magnetic elements on the first stator are displaced in the direction of the axis relative to the discrete magnetic elements on the second stator.

This aspect of the disclosure extends to a method of resetting a frictionless safety brake actuator in accordance with the present disclosure, the method comprising: applying an alternating current to the electromagnet(s) of the first set of magnets until the magnet array has moved into the second position.

The method may comprise applying the alternating current in response to a reset signal.

It will be appreciated from the present disclosure that when an alternating current is applied to the electromagnet(s) in the first magnet set in use, the alternating current causes a strongest region of the magnetic field to alternate between the first and second sides of the magnet array, such that the magnet array is alternately attracted to the discrete magnetic elements of the first and second stators, thereby causing the magnet array to move against the biasing force towards the second position due to the staggered configuration of the discrete magnetic elements. The magnet array may thereby be moved into the second position to move the linkage into a non-actuated position to disengage the safety brake. The frictionless safety brake actuator may thus be reset through the application of an alternating current to the electromagnet(s) of the first magnet set.

It will also be appreciated that the presence of a biasing arrangement to bias the magnet array to the first position means that the linkage can be actuated through control of the electromagnet(s) in the first magnet set (and, optionally, where present, any electromagnets in the second magnet set), e.g. by switching off the electromagnet(s). The frictionless safety brake actuator thus provides actuation for a safety brake without the aid of frictional contact between the frictionless safety brake actuator and the guide rail. This provides the advantage that actuation of the safety brake is not affected by the state of the elevator guide rail, so any potential debris from the elevator hoistway or dirt from the elevator guide rail will not interfere with the actuation of the frictionless safety brake actuator. Further, the location of the frictionless safety brake actuator is not restricted by the need for contact with the guide rail during actuation, and can be positioned anywhere on an elevator component where the linkage can then actuate the safety brake. In some examples no component of the frictionless safety brake actuator comes into frictional contact with the elevator guide rail.

It is known in the art how to arrange an array of magnets to produce a stronger magnetic field on one side of the array than on an opposing side of the array. Examples of such arrays may be known in the art as Halbach arrays. For example, a plurality of magnets may be arranged in an array extending along a first axis. Each magnet may have an orientation that is rotated relative to an orientation of an adjacent magnet in the array about a second axis that is perpendicular to the first axis. The first and second axes define a plane in which said axes lie, and such an array gives rise to a stronger magnetic field on one side of said plane than on an opposing side of the plane. The field on the opposing side may be substantially suppressed, e.g. close to zero.

It is to be understood that the term "orientation" or "magnetic orientation" of a magnet as used herein refers to the orientation of a magnetic axis extending from the south pole to the north pole of the magnet. It will be understood that the orientation of an electromagnet depends on the direction of a current applied to the electromagnet, and that the magnetic orientation of an electromagnet under application of a forward current is anti-parallel to the magnetic orientation of the electromagnet under application of a reverse current. As such, if the orientation of an electromagnet is described as being oriented parallel or perpendicular to a specified direction, this applies to both the forward and reverse current directions. When a magnet is described as "being oriented" in a direction, this means that the magnetic orientation of the magnet is in the specified direction. It is to be understood that when an orientation is described as being in a specified direction, e.g. parallel or perpendicular to a direction, this does not necessarily require exact orientation in the specified direction, but may include the orientation being substantially oriented in the specified direction. Each magnet in the first and second sets of magnets may be straight or substantially straight, e.g. a bar magnet, or an electromagnet having a core and/or a coil with a straight elongate axis extending through the centre thereof.

The respective orientations of the electromagnet(s) of the first magnet set and of the magnet(s) of the second magnet set may all lie in a plane that is parallel to the axis and perpendicular to the first and second stators (i.e. to the planes in which the stators lie).

The first and second magnet sets may comprise a total of N magnets arranged in N positions indexed from n=1 to n=N along the axis, wherein N is at least 3, e.g. at least 4, e.g. at least 5, at least 6, e.g. at least 7. N may be more than 3, e.g. 4, 5, 6 or 7. N may be an odd number. Positions indexed by an odd value of n may be occupied by an electromagnet of the first magnet set and positions indexed by an even value of n may be occupied by a magnet of the second magnet set. Alternatively, positions indexed by an even value of n may be occupied by an electromagnet of the first magnet set and positions indexed by an odd value of n may be occupied by a magnet of the second magnet set.

The electromagnet(s) of the first magnet set and the magnet(s) of the second magnet set may be oriented such that, when a forward current is being applied to the electromagnet(s) of the first magnet set, for n=1 to n=N−1, the $(n+1)^{th}$ magnet has an orientation that is rotated by 90° with respect to the orientation of the $n^{th}$ magnet in a first rotational direction, and when a reverse current is being applied to the electromagnet(s) of the first magnet set, for n=1 to n=N−1, the $(n+1)^{th}$ magnet has an orientation which is rotated by 90° with respect to the $n^{th}$ magnet in a second rotational direction which is opposite to the first rotational direction.

In some examples, the electromagnet(s) of the first magnet set may be oriented perpendicular to the axis and the magnet(s) of the second magnet set may be oriented parallel to the axis. In some other examples, the electromagnet(s) of the first magnet set may be oriented parallel to the axis and the magnet(s) of the second magnet set may be oriented perpendicular to the axis.

In a set of examples, the magnet array may consist of three magnets, wherein either: i) the three magnets include first and second electromagnets belonging to the first magnet set and an interposed magnet belonging to the second magnet set, wherein the interposed magnet is positioned between the first and second electromagnets in the stack; or ii) the three magnets include first and second magnets belonging to the second magnet set and an interposed electromagnet belonging to the first magnet set, wherein the interposed electromagnet is positioned between the first and second magnets in the stack.

In alternative i), the first and second electromagnets may be oriented perpendicular to the first axis and anti-parallel to each other, both when a forward current is applied to the first and second electromagnets and when a reverse current is applied to the first and second electromagnets. For example, the first and second electromagnets may each have a respective orientation such that, when a forward current is applied to the first and second electromagnets, the first electromagnet has an orientation directed towards the first stator and the second electromagnet has an orientation directed towards the second stator, and when a reverse current is applied to the first and second electromagnets, the first electromagnet has an orientation directed towards the second stator and the second electromagnet has an orientation directed towards the first stator. In alternative i), the interposed magnet may have an orientation parallel to the axis, e.g. directed towards the first position or directed towards the second position.

In alternative ii), the interposed electromagnet may be oriented parallel to the first axis. For example, the orientation of the interposed electromagnet may be directed towards the first position when a forward current is applied to the interposed electromagnet, and directed towards the second position when a reverse current is applied to the interposed electromagnet. In alternative ii), the first and second magnets may be oriented perpendicular to the first axis and anti-parallel to each other, e.g. the first magnet may have an orientation directed towards the first stator and the second magnet may have an orientation directed towards the second stator.

The magnet array may be configured (e.g. by selecting the total number of magnets, their respective strengths, their orientations, etc.) and/or a peak voltage of the alternating current may be selected such that the magnetic field on the second side of the magnet array is substantially zero during a peak forward current and the magnetic field on the first side of the magnet array is substantially zero during a peak reverse current.

The magnet(s) of the second magnet set may each comprise or consist of any kind of magnet whose orientation is constant, e.g. configured not to be changed by the application of an alternating current, unlike the electromagnet(s) of the first magnet set. For example, the magnet(s) of the second magnet set may each comprise or consist of a permanent magnet, or an electromagnet having a direct current applied thereto in use. In some examples, the or each magnet in the second magnet set is a permanent magnet.

The first and second stators may be separate structures, but this is not essential. For example, the first and second stators could be two parts of a single structure shaped to provide opposing parallel support surfaces for the arrays of discrete magnetic elements.

The first and second stators may be made from a magnetic material, e.g. a ferromagnetic material, e.g. iron. The arrays of discrete magnetic elements of the first and second stators may each comprise a respective array of protrusions of magnetic material that protrude from the respective stator towards the magnet array.

The arrays of discrete magnetic elements may each comprise a respective array of permanent magnets, e.g. formed or mounted in or on the respective stator. The stators may be made from a non-magnetic material. The discrete magnetic elements may comprise shading coils.

It will be understood from the present disclosure that having discrete magnetic elements means that the stators may have regions or portions that are attracted by the magnetic field of the magnet array, wherein the regions or portions are separated by interstitial regions or portions that are less attracted or not attracted by the magnetic field of the magnet array, e.g. owing to being non-magnetic or less magnetic, being further away from the magnet array (e.g. recessed between protrusions), or being a gap in the stator, etc.

The discrete magnetic elements of the first and second stators may be evenly spaced along the axis with a spacing S, e.g. wherein the spacing is measured between corresponding points (e.g. centre points) of adjacent discrete magnetic elements, and wherein S may be the same for both of the first and second stators. Each discrete magnetic element may have a dimension D (e.g. a width) in the direction of the axis, wherein D may be the same for all discrete magnetic elements on both the first and second stators. There may be gaps (e.g. recesses) between adjacent discrete magnetic elements, wherein each gap may have a dimension G (e.g. a width) in the direction of the axis, wherein G may be the same for all gaps on both the first and second stators. The spacing S between corresponding points (e.g. centre points) of adjacent discrete magnetic elements may therefore be $S=D+G$.

As mentioned above, the discrete magnetic elements on the first stator are displaced in the direction of the axis relative to the discrete magnetic elements on the second stator. The discrete magnetic elements on the first stator may be displaced along the axis (e.g. towards the second position) relative to the discrete magnetic elements on the second stator by a distance X, wherein X may be less than 50% of S, e.g. less than 40% of S; equal to 50% of S; or more than 50% of S, e.g. more than 60% of S. X may be between 25% and 75% of S, e.g. between 40% and 60% of S, or e.g. between 30% and 40% of S, or e.g. between 60% and 70% of S.

The frictionless safety brake actuator may further comprise a guiding arrangement extending along or parallel to the axis, wherein the guiding arrangement may be configured to constrain the magnet array against movement transverse to (i.e. not parallel to) the axis. The magnet array may thereby be confined to movement along the axis.

The guiding arrangement may comprise a guiding element, e.g. a rod, extending through a hole that extends through the magnet array along or parallel to the axis. The guiding arrangement may comprise one or more protruding tracks with corresponding slots (e.g. with the slots provided on the magnet array and the tracks provided on a wall of the frictionless safety brake actuator, or vice versa), wherein the tracks and slots are parallel to the axis. Other guiding arrangements are possible.

The biasing arrangement may comprise or consist of a resilient biasing member, e.g. a spring. Other biasing arrangements are possible, and some non-limiting examples of other possible biasing arrangements include a magnetic biasing arrangement, a hydraulic biasing arrangement, pneumatic springs, rubber springs, coil springs, a bent piece of metal. The biasing arrangement may be arranged to apply a biasing force by pushing the magnet array or by pulling the magnet array, e.g. the biasing arrangement may comprise or consist of a resilient biasing member arranged such that it is under tension when the magnet array is in the second position, or such that it is under compression when the magnet array is in the second position.

The electromagnet(s) in the first magnet set may each comprise a respective coil with a respective coil axis corresponding to the electromagnet's orientation. In examples having two or more electromagnets in the first magnet set, the coils of the electromagnets in the first magnet set (or, in examples having more than two electromagnets in the first magnet set, of alternate electromagnets of the first magnet set in the stack) may be wound in opposite directions, e.g. so that a current flowing along both (or all) electromagnets in the same direction gives rise to different (or alternating) electromagnet orientations owing to the different (or alternating) coil winding directions. This may simplify the electrical connections of the electromagnets in the magnet array.

As discussed above, when an alternating current is applied to the electromagnet(s) in the first magnet set in use, the magnetic field of the magnet array may cause the magnet array to be attracted to the discrete magnetic elements of the stator that is facing the side of the magnet array with the strongest region of the magnetic field. In particular, magnet array may be attracted to one or more discrete magnet elements whose position(s) along the axis is/are closer than the magnet array to the second position. This attraction may cause the magnet array to move along the axis against the biasing force and towards the second position in order to move closer to the discrete magnetic element(s) it is attracted to. When the current changes direction, the magnet array is attracted to the discrete magnetic elements on the other stator. Again, the magnet array may be attracted to one or more discrete magnet elements whose position(s) along the axis is/are closer than the magnet array to the second position. This attraction may cause the magnet array to move further along the axis against towards the second position in order to move closer to the discrete magnetic element(s) it is attracted to. Each time the magnet array moves along the axis towards the discrete magnetic element(s) on one stator, its momentum may help to carry it onward along the axis, which may help to bring the magnet array into closer proximity to the next nearest discrete magnetic element(s) on the other stator, aiding the attraction to the next nearest discrete magnetic element(s) when the current changes direction. This process may continue as the magnetic field alternates, until the magnet array reaches the second position.

The alternating current may have any suitable frequency, e.g. the frequency of the alternating current may be in the range 40 Hz to 70 Hz, e.g. 50 Hz to 60 Hz, 50 Hz or 60 Hz.

The magnet array may comprise a plurality of protrusions. The magnet(s) of one of the first and second magnet sets may comprise the protrusions. In examples in which the magnet(s) of one of the first and second magnet sets is/are oriented perpendicular to the axis, the magnet set which comprises the protrusions may be the magnet set whose magnet(s) is/are oriented perpendicular to the axis. Each magnet in the magnet set which comprises the protrusions may comprise one or more protrusion facing the first stator and one or more protrusions facing the second stator.

Each electromagnet in the first magnet set may comprise a core made from a magnetic material, e.g. an iron core. Each electromagnet in the first magnet set (e.g. as part of its core) may comprise one or more protrusions that correspond to the discrete magnetic elements on the first and second stators, e.g. one or more protrusions facing the first stator and one or more protrusions facing the second stator.

Each magnet in the second magnet set may comprise one or more protrusions that correspond to the discrete magnetic elements on the first and second stators, e.g. one or more protrusions facing the first stator and one or more protrusions facing the second stator.

The protrusions may be arranged to align alternately with one or more of the discrete magnetic elements on the first stator and with one or more of the discrete magnetic elements on the second stator as the magnet array moves towards the second position during application of an alternating current to the electromagnet(s) in the first magnet set. The protrusions may help to direct the magnetic flux of the magnet array towards the discrete magnetic elements, enhancing the attraction between the magnet array and the discrete magnetic elements, helping to move the magnet array along the axis against the biasing force of the biasing arrangement.

In some examples in which the magnet array comprises protrusions, when the magnet array is in the first position, one or more protrusions on one side of the magnet array (e.g. on the first side or on the second side) may be partially overlapped with one or more corresponding protrusions on the corresponding stator (e.g. on the first stator or on the second stator, respectively). This may help to attract the magnet array to the protrusion(s) on said corresponding stator when an alternating current is applied to the electromagnet(s) in the first magnet set. For example, the overlap may help accelerate the magnet array against the biasing force of the biasing arrangement from a stationary state in the first position.

Owing to the attraction between the overlapping protrusions on the magnet array and on the stator, the magnet array may move in the direction of the second position such that the protrusion(s) on the magnet array facing said corresponding stator may become aligned with corresponding protrusion(s) on said stator. Owing to the movement of the magnet array in the direction of the second position, the protrusion(s) on the magnet array facing the other one of the first and second stators may become partially overlapped with corresponding protrusion(s) on said other stator. As the magnet array moves in the direction of the second position, its momentum may help move it into the partially overlapped position. In some examples, the protrusions on said other stator may be displaced by a distance less than 50% of S along the axis towards the second position, which may help to create the partial overlap. This may be beneficial e.g. when the alternating current is initially applied to the electromagnet(s), because at that point, the magnet array may not yet have much momentum to move it towards the overlapped position.

The frictionless safety brake actuator or the elevator system may be configured to discontinue applying the alternating current and to apply a direct current to the electromagnet(s) in the first magnet set after the magnet array has reached the second position, e.g. immediately after or following a delay after the magnet array has reached the second position.

The method may comprise discontinuing the alternating current and applying a direct current to the electromagnet(s) in the first magnet set after the magnet array has reached the second position, e g immediately after or following a delay after the magnet array has reached the second position.

In a set of examples, the frictionless safety brake actuator may comprise a limit switch arranged to detect when the magnet array has reached the second position. The frictionless safety brake actuator or the elevator system may be configured to discontinue applying the alternating current and to apply a direct current to the electromagnet(s) in the first magnet set in response to the limit switch detecting that the magnet array has reached the second position.

The method of resetting the frictionless safety brake actuator may comprise detecting, by a or the limit switch, that the magnet array has reached the second position. The method may comprise receiving a signal from the limit switch indicating that the magnet array has reached the second position. The method may comprise, in response to detecting by the limit switch that the magnet array has reached the second position (e.g. in response to receiving the limit switch signal), discontinuing the alternating current and applying a direct current to the electromagnet(s) in the first magnet set.

The alternating current may be discontinued without delay, e.g. immediately, upon detecting that the magnet array has reached the second position. The direct current may be applied without delay, e g immediately, upon detecting that the magnet array has reached the second position.

When the alternating the current is discontinued, the magnetic field no longer alternates between the first and second sides of the magnet array, and so the magnet array stops moving along the axis. Instead, the direct current may cause a constant magnetic field on one side of the magnet array, such that the magnet array remains attracted to the discrete magnetic elements on said side of the array, holding the magnetic array in the second position. The direction of the direct current may be selected such that the magnetic field is strongest on a side of the magnet array where the protrusion(s) on the magnet array is/are aligned with the discrete magnetic element(s). The application of the direct current may be maintained to hold the magnet array in the second position until the safety brake is required to be activated again.

In a set of examples, the frictionless safety brake actuator may comprise a stop arrangement positioned to prevent movement of the magnet array along the axis beyond the second position. For example, the stop arrangement may comprise a plate or block positioned on the axis, e.g. the stop arrangement may comprise a base, wall or ceiling of the frictionless safety brake actuator.

The stop arrangement may be positioned such that when the magnet array reaches the second position, the magnet array abuts the stop arrangement. The normal reaction force of the stop arrangement may oppose any component along the axis of the magnetic forces on the magnet array arising from the attraction of the magnet array to the discrete magnetic elements.

When the magnet array is in the second position, continued application of the alternating current may cause the magnet array to continue to be attracted to the discrete magnetic elements on each stator alternately. This may retain the magnet array in the second position against the biasing force of the biasing arrangement.

The stop arrangement may be magnetic. For example, the stop arrangement may comprise a ferromagnetic material, e.g. iron, and/or it may comprise permanent magnets. This may help to retain the magnet array in the second position while the alternating current is applied.

The stop arrangement may comprise discrete magnetic elements (e.g. protrusions of magnetic material, or permanent magnets) facing the magnetic array. The magnet array may have protrusions corresponding to the discrete magnetic elements of the stop arrangement (e.g. protruding portions of the magnet or the core of the electromagnet facing the stop arrangement) that are positioned to align with the discrete magnetic elements of the stop arrangement when the magnetic array is in the second position. The protrusions may help to direct the magnetic flux of the magnet array to help the magnet array attract the stop arrangement to retain the magnet array in the second position.

When the magnet array is in the second position, continued application of the alternating current may cause the magnet array to be attracted to the stop arrangement, e.g. to alternate sides of the stop arrangement. This attraction may hold the magnet array in the second position against the biasing force of the biasing arrangement.

After the magnet array reaches the second position, the application of the alternating current may be maintained until the safety brake is required to be activated again.

Alternatively, after the magnetic array reaches the second position, the alternating current may be discontinued and a direct current may be applied to the electromagnet(s) in the first magnet set instead. The direct current may cause a constant magnetic field on one side of the magnet array, such that the magnet array remains attracted to the discrete magnetic elements on said side of the array and/or to the stop arrangement (e.g. to the discrete magnetic elements thereof), holding the magnetic array in the second position. The direction of the direct current may be selected such that magnetic field is strongest on a side of the magnet array where the protrusions on the magnet array are aligned with the discrete magnetic elements of the corresponding stator. After the magnet array reaches the second position, the application of the direct current may be maintained until the safety brake is required to be activated again.

Although both an alternating current and a direct current may be effective to hold the magnet array in the second position, using a direct current for this purpose may be more energy efficient than using an alternating current.

As the alternating current may hold the magnet array in the second position, it is not necessary to switch from the alternating current to the direct current at a precise or specific time corresponding to the arrival of the magnet array at the second position, e.g. in response to a switch detecting that the magnet array has reached the second position. For example, the current may be switched from alternating current to direct current a pre-determined time after the alternating current is started, which may be following a delay after the magnet array has reached the second position.

As noted above, application of a direct current or an alternating current may be maintained to hold the magnet array in the second position until the safety brake is required to be activated again. When the safety brake is required to be activated, the direct current or alternating current that is being applied to the electromagnet(s) in the first magnet set may be discontinued. In examples in which the second magnet set comprises one or more electromagnets (e.g. with a direct current applied thereto), the current to the one or more electromagnets in the second magnet set may also be discontinued when the safety brake is required to be activated. Discontinuation of the current to the electromagnet(s) in the first magnet set (and optionally, where present, to any electromagnets in the second magnet set) may occur in response to a signal to activate the safety brake, or it may occur in the event that power to the frictionless safety brake actuator is disconnected, e.g. in the event of a power failure.

When the direct or alternating current is discontinued, there is insufficient attraction between the magnet array and the stators (and/or, where applicable, between the magnet array and the stop arrangement) to hold the magnet array against the biasing force of the biasing arrangement. Consequently, the magnet array moves under the biasing force from the second position to the first position. This movement of the magnet array exerts a force on the linkage to actuate the linkage. This force is transmitted by the linkage to the safety brake, causing the safety brake to be brought into frictional engagement with the guide rail.

The frictionless safety brake actuator may be configured or capable of being configured to be electronically or electrically actuated, e.g. by a controller providing an actuation signal to the frictionless safety brake actuator and/or interrupting an electrical power supply to the frictionless safety brake actuator. Such frictionless safety brake actuators may be referred to as "frictionless electronic safety actuators".

The frictionless safety brake actuator may comprise a controller. The frictionless safety brake actuator may be controlled by a controller that is external to the frictionless safety brake actuator. For example, the elevator system may comprise the controller, e.g. the controller may be mounted in or on the elevator car. The controller may be configured to receive signals, e.g. a reset signal or a signal from the limit switch. The controller may control the current(s) applied to the electromagnet(s) in the first magnet set (and optionally, where present, to any electromagnets in the second magnet set), e.g. it may apply, change or discontinue current(s) applied to the electromagnet(s). The controller may control the current(s) in response to signals, e.g. a reset signal or a signal from the limit switch.

DRAWING DESCRIPTION

Certain preferred examples of this disclosure will now be described, by way of example only, with reference to the accompanying drawings, in which.

DETAILED DESCRIPTION

Figure 1:
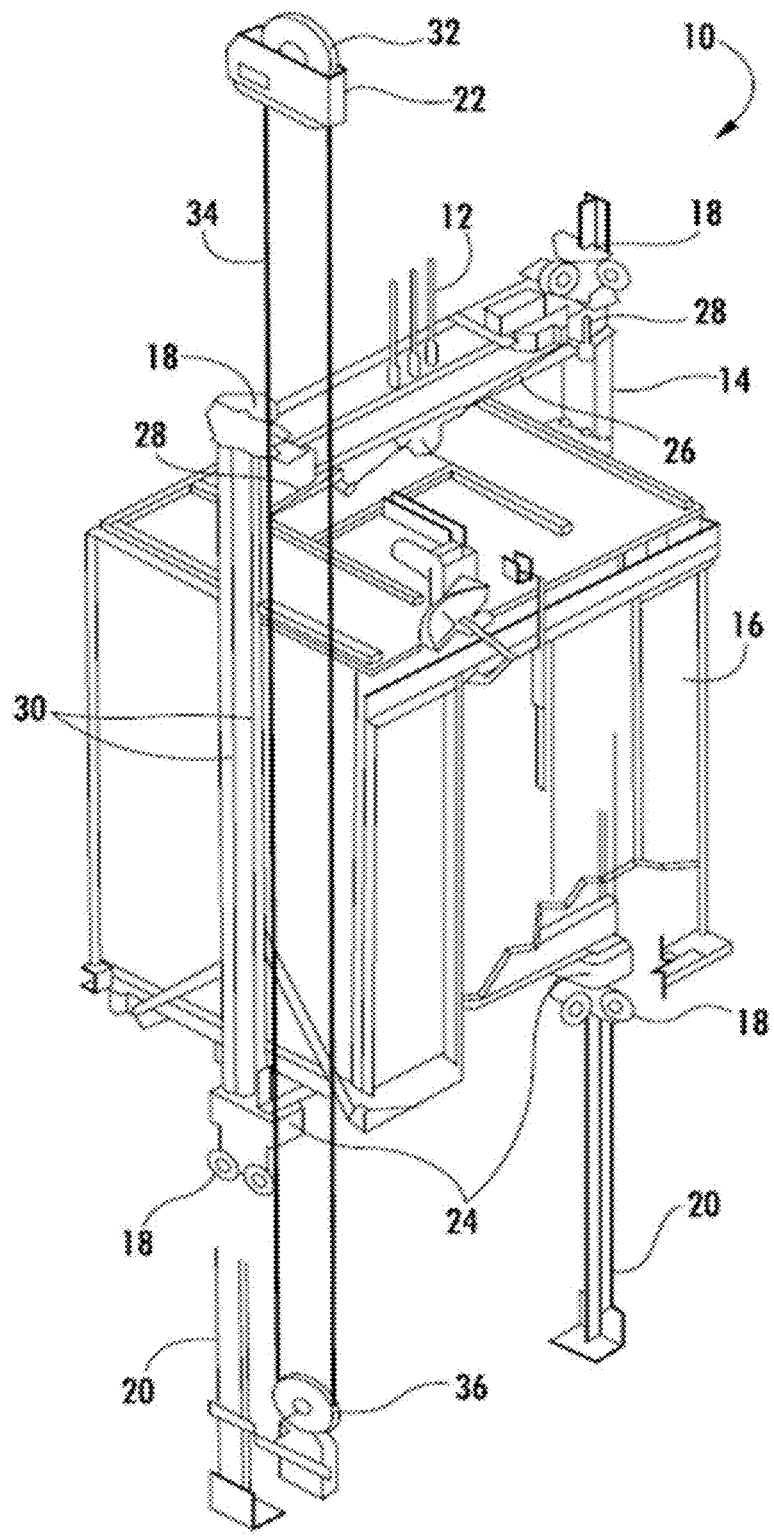
FIG. 1 shows an example of an elevator system employing a mechanical governor.

FIG. 1 shows an elevator system, generally indicated at 10. The elevator system 10 includes cables or belts 12, a car frame 14, an elevator car 16, roller guides 18, guide rails 20, a governor 22, and a pair of safety brakes 24 mounted on the elevator car 16. The governor 22 is mechanically coupled to actuate the safety brakes 24 by linkages 26, levers 28, and lift rods 30. The governor 22 includes a governor sheave 32, rope loop 34, and a tensioning sheave 36. The cables 12 are connected to the car frame 14 and a counterweight (not shown) inside a hoistway. The elevator car 16, which is attached to the car frame 14, moves up and down the hoistway by a force transmitted through the cables or belts 12 to the car frame 14 by an elevator drive (not shown) commonly located in a machine room at the top of the hoistway. The roller guides 18 are attached to the car frame 14 to guide the elevator car 16 up and down the hoistway along the guide rails 20. The governor sheave 32 is mounted at an upper end of the hoistway. The rope loop 34 is wrapped partially around the governor sheave 32 and partially around the tensioning sheave 36 (located in this example at a bottom end of the hoistway). The rope loop 34 is also connected to the elevator car 16 at the lever 28, ensuring that the angular velocity of the governor sheave 32 is directly related to the speed of the elevator car 16.

In the elevator system 10 shown in FIG. 1, the governor 22, a machine brake (not shown) located in the machine room, and the safety brakes 24 act to stop the elevator car 16 if it exceeds a set speed as it travels inside the hoistway. If the elevator car 16 reaches an over-speed condition, the governor 22 is triggered initially to engage a switch, which in turn cuts power to the elevator drive and drops the machine brake to arrest movement of the drive sheave (not shown) and thereby arrest movement of elevator car 16. If, however, the elevator car 16 continues to experience an overspeed condition, the governor 22 may then act to trigger the safety brakes 24 to arrest movement of the elevator car 16 (i.e. an emergency stop). In addition to engaging a switch to drop the machine brake, the governor 22 also releases a clutching device that grips the governor rope 34. The governor rope 34 is connected to the safety brakes 24 through mechanical linkages 26, levers 28, and lift rods 30. As the elevator car 16 continues its descent, the governor rope 34, which is now prevented from moving by the actuated governor 22, pulls on the operating levers 28. The operating levers 28 actuate the safety brakes 24 by moving the linkages 26 connected to the lift rods 30, and the lift rods 30 cause the safety brakes 24 to engage the guide rails 20 to bring the elevator car 16 to a stop.

It will be appreciated that, whilst a roped elevator is described here, the examples of a frictionless safety brake actuator described here will work equally well with a ropeless elevator system e.g. hydraulic systems, systems with linear motors, and other ropeless elevator designs.

Whilst mechanical speed governor systems are still in use in many elevator systems, others (e.g. ropeless elevator systems without mechanical speed governor systems) are now implementing electronically or electrically actuated systems to trigger the emergency safety brakes 24. Most of these electronically or electrically actuated systems use friction between a magnet and the guide rail 20 to then mechanically actuate a linkage to engage the safety brakes 24. Examples of an safety brake actuator are disclosed herein which do not utilize friction against the guide rail 20 to actuate the safety brakes 24.

Figure 2:
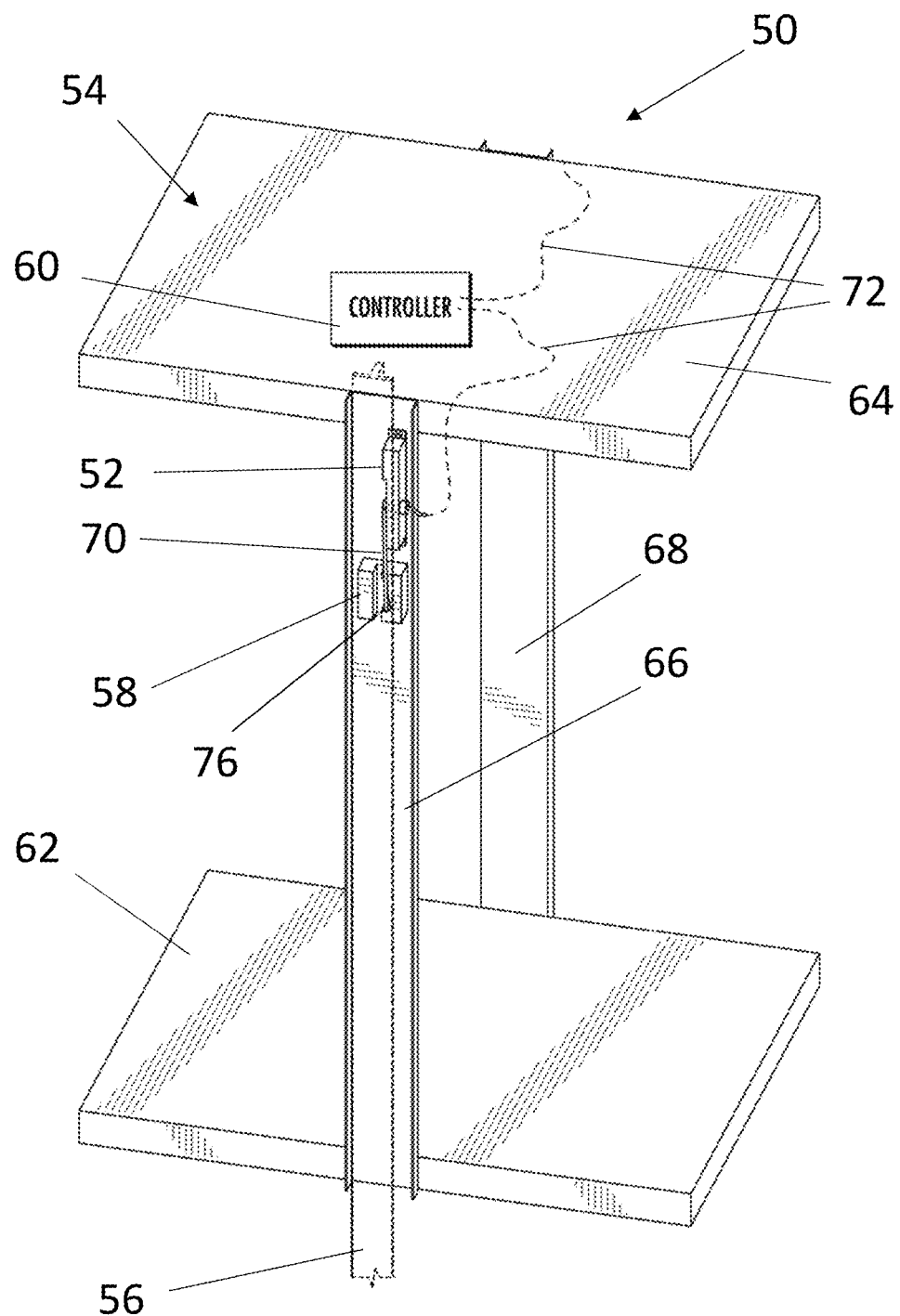
FIG. 2 shows an example of an elevator system employing an electronically actuated frictionless safety brake actuator.

FIG. 2 shows an example of an elevator system 50 employing an electronically actuated frictionless safety brake actuator 52. The elevator system 50 comprises the frictionless safety brake actuator 52, an elevator car 54, two guide rails 56, a safety brake 58, and a controller 60. For clarity, one of the guide rails 56 is shown in dotted outline and the other guide rail is omitted from FIG. 2.

The elevator car 54 comprises a platform 62, a ceiling 64, a first structural member 66 and a second structural member 68. The first and second structural members 66, 68 may be referred to as "uprights". The elevator car 54 also comprises panels and other components forming walls of the elevator car 54, but those panels and other components are omitted from FIG. 2 for clarity.

The frictionless safety brake actuator 52 and the safety brake 58 are mounted on the first structural member 66. The frictionless safety brake actuator 52 is mechanically connected to the safety brake 58 via a linkage 70. A second safety brake actuator and a second safety brake are provided on the second structural member, but these are omitted for clarity. The controller 60 is mounted in the ceiling 64 and is in communication with the frictionless safety brake actuator 52 via connections 72.

The safety brake 58 has a slot 76 which accommodates the guide rail 56. The frictionless safety brake actuator 52 is positioned above the safety brake and adjacent to the guide rail 56, although other positions are possible, e.g. the frictionless safety brake actuator 52 may be in a position that is not adjacent to the guide rail 56 as it does not require frictional contact with the guide rail 56 during its operation. In use, the elevator car 54 moves up and down the guide rails 56. In the event that the safety brake 58 needs to be engaged (e.g. in an elevator car overspeed situation), the controller 60 sends a signal to the frictionless safety brake actuator 52 to engage the safety brake 58. In response to the signal, an actuation mechanism in the frictionless safety brake actuator 52 exerts a pulling force on the linkage 70. The pulling force is transmitted via the linkage 70 to the safety brake 58, pulling the safety brake 58 into frictional engagement with the guide rail 56, bringing the elevator car 54 to a stop.

The frictionless safety brake actuator 52 may, for example, operate in accordance with one of the example frictionless safety brake actuators described below with reference to FIGS. 3, 5A to 5D, 6 and 7A to 7B.

In the description of the following examples of frictionless safety brake actuators, the terms "left", "right", "up", "down", "above", "below" and similar positional and directional terms are used to refer to certain depicted features. These terms are used purely for convenience to refer to the position or orientation of those features when viewed in the figures, and do not necessarily imply any requirement on position or orientation of those features in frictionless safety brake actuators in accordance with the disclosure.

Figure 3:
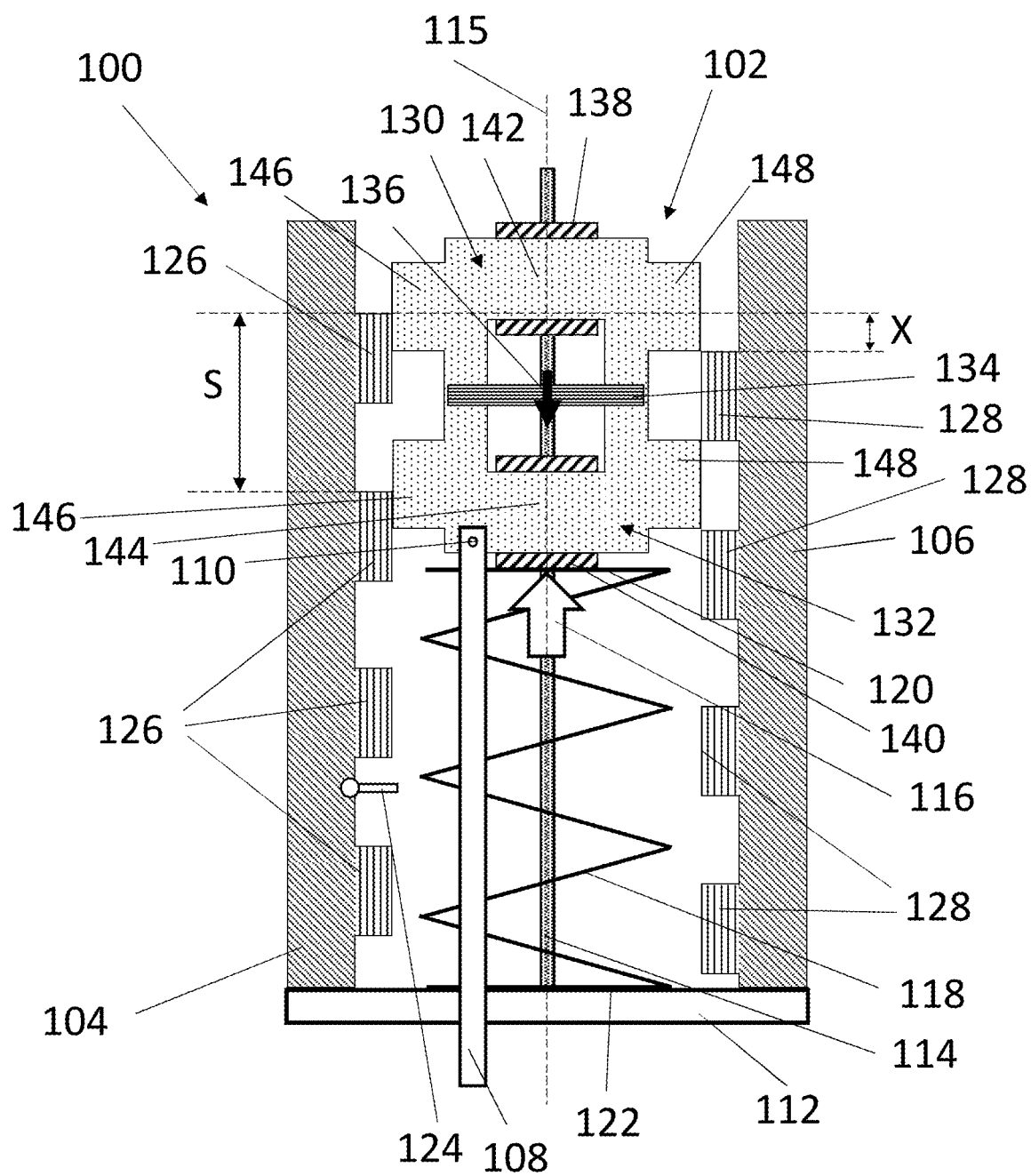
FIG. 3 shows a side view of a first example of a frictionless safety brake actuator in accordance with the present disclosure.

FIG. 3 shows a side view of a first example of a frictionless safety brake actuator 100 in accordance with the present disclosure.

The frictionless safety brake actuator 100 comprises a magnet array 102 positioned between a left stator 104 and a right stator 106. The frictionless safety brake actuator 100 also comprises a linkage 108 which is attached at a first end thereof to a connection point 110 on the magnet array 102. A second end of the linkage 108 is attached to a safety brake (not shown in FIG. 3 but depicted in and discussed below with reference to FIG. 6), such that when the linkage 108 is pulled upwards, the safety brake is engaged, and when the linkage 108 is pushed downwards, the safety brake is disengaged.

The frictionless safety brake actuator 100 also comprises a base 112 on which the stators 104, 106 are mounted, and a guiding element 114 which extends vertically upwards along an axis 115 from the base 112 between the stators 104, 106. In this example, the guiding element is a rod, but other types of guiding element are possible. The magnet array 102 is moveable along the guiding element 114 between a first position in which the linkage 108 is actuated and a second position in which the linkage 108 is not actuated. FIG. 3 shows the magnet array 102 in the first (actuated) position. The guiding element 114 restricts movement of the magnet array 102 to the vertical direction, e.g. preventing any non-vertical component of movement of the magnet array 102.

The frictionless safety brake actuator 100 also comprises a biasing arrangement which exerts an upwards biasing force (as shown by the arrow 116) to bias the magnet array 102 towards the first position. In this example, the biasing arrangement is a spring 118, although other biasing arrangements may be used in this and other examples, e.g. a magnetic biasing arrangement, a hydraulic biasing arrangement, pneumatic springs, rubber springs, coil springs, a bent piece of metal, etc. A first end 120 of the spring 118 is fixedly attached to the magnet array 102 and a second end 122 of the spring 118 is fixedly attached to the base 112.

The frictionless safety brake actuator 100 also comprises a limit switch 124 which is positioned to detect when the frictionless safety brake actuator 100 has reached the second position. The function of the limit switch 124 is described in more detail below with reference to FIG. 5D.

In this example, the stators 104, 106 are made from iron, and each stator 104, 106 comprises an array of teeth 126, 128 that protrude horizontally inwards, i.e. towards the magnet array 102 between the stators 104, 106. The teeth 126, 128 on each stator 104, 106 are separated by a spacing distance S. The teeth 128 on the right stator 106 are displaced vertically downwards with respect to the teeth 126 on the left stator 104 by a displacement distance X that is less than half of the spacing distance S. In this example, the displacement distance X is approximately 25% of the spacing distance S. However, these stators are just an example and other stator structures and teeth arrangements are possible in variations on this example and in other examples.

The magnet array 102 comprises an upper electromagnet 130 and a lower electromagnet 132 with a permanent magnet 134 positioned between them. The upper and lower electromagnets 130, 132 together correspond a first magnet set, and the permanent magnet corresponds to a second magnet set. The permanent magnet 134 is oriented vertically with its north pole pointing downwards, as shown by the arrow 136. The upper and lower electromagnets 130, 132 each comprise a respective coil 138, 140 wound around a respective iron core 142, 144.

The core 142, 144 of each electromagnet 130, 132 is shaped to have a left protrusion 146 and a right protrusion 148 that extend towards the left stator 104 and the right stator 106 respectively. The protrusions 146, 148 are positioned such that they may be brought into alignment and into close proximity with the teeth 126, 128 on the stators 104, 106 as the magnet array 102 moves up and down the guiding element 114. The protrusions 146, 148 help to direct magnetic flux from the cores 142, 144 towards the stator teeth 126, 128.

The coils 138, 140 of the electromagnets 130, 132 are configured to be supplied with an electric current which can be changed between alternating current and direct current. When a current is supplied to the electromagnets 130, 132, the same current is supplied to both electromagnets 130, 132 at any given time. The electromagnets 130, 132 and their coils 138, 140 are configured such that when a current is supplied to the electromagnets 130, 132, the direction of magnetic flux within the coils 138, 140 is directed to the left for one coil and to the right for the other coil, e.g. anti-parallel to each other and perpendicular to the permanent magnet's orientation. When the current changes direction, the magnetic orientation of both electromagnets 130, 132 is reversed.

This particular configuration of the magnet array 102 is just one example. In other examples, the permanent magnet could be pointing upwards. In other examples, the magnet array could comprise one electromagnet positioned between two permanent magnets, wherein the permanent magnets' orientations are anti-parallel and pointing left and right, while the electromagnet is oriented vertically and alternates between pointing upwards and pointing downwards when an alternating current is applied to the electromagnet. Other configurations of the magnet array are possible in variations on this example and in other examples. For example, there may be more than three magnets in total. Electromagnets supplied with a direct current may be used instead of permanent magnets.

The function of the magnet array 102 is described below with reference to FIGS. 4A to 4D.

Figure 4A:
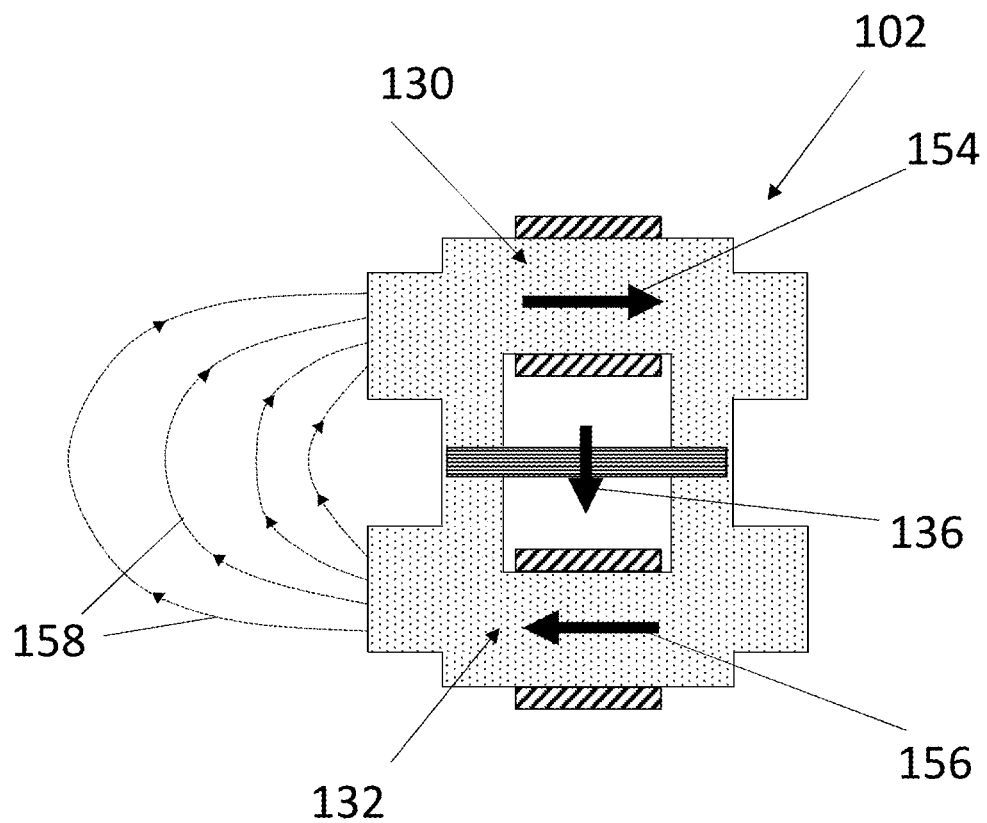
FIG. 4A shows a magnet array of the first example under the application of a forward current.
Figure 4B:
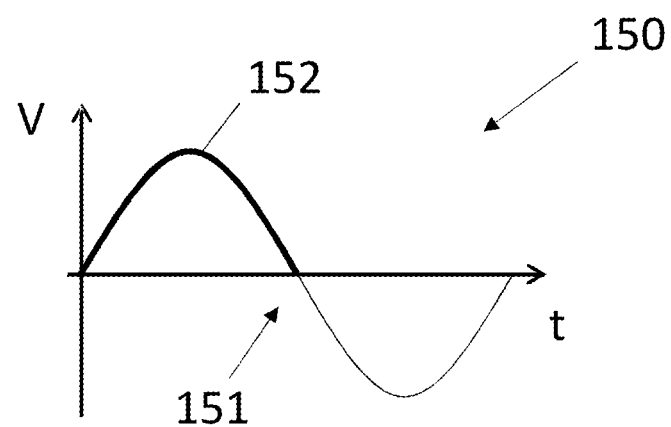
FIG. 4B shows a voltage-time graph representing one cycle of alternating current, indicating the portion of the cycle corresponding to forward current.

FIG. 4A shows the magnet array 102 during application of forward current to the electromagnets 130, 132, e.g. such as during the first half of an alternating current cycle. FIG. 4B shows a graph 150 of the variation in voltage against time for one period of an alternating current (151). The bold line 152 shows the portion of the cycle where the current is in a forward direction, i.e. which corresponds to the situation depicted in FIG. 4A.

Referring again to FIG. 4A, the forward current creates a magnetic field in and around each electromagnet 130, 132, wherein the magnetic orientation of the upper electromagnet 130 is to the right (as shown by the arrow 154) and the magnetic orientation of the lower electromagnet 132 is to the left (as shown by the arrow 156). As mentioned above, the magnetic orientation of the permanent magnet 134 is downwards (as shown by the arrow 136).

As will be understood by the skilled person, this arrangement of magnetic orientations (which is an example of a Halbach array) will give rise to a resultant magnetic field that extends to the left of the magnet array 102, as shown by the magnetic flux lines 158, while the magnetic field to the right of the magnet array 102 is suppressed to near zero.

Figure 4C:
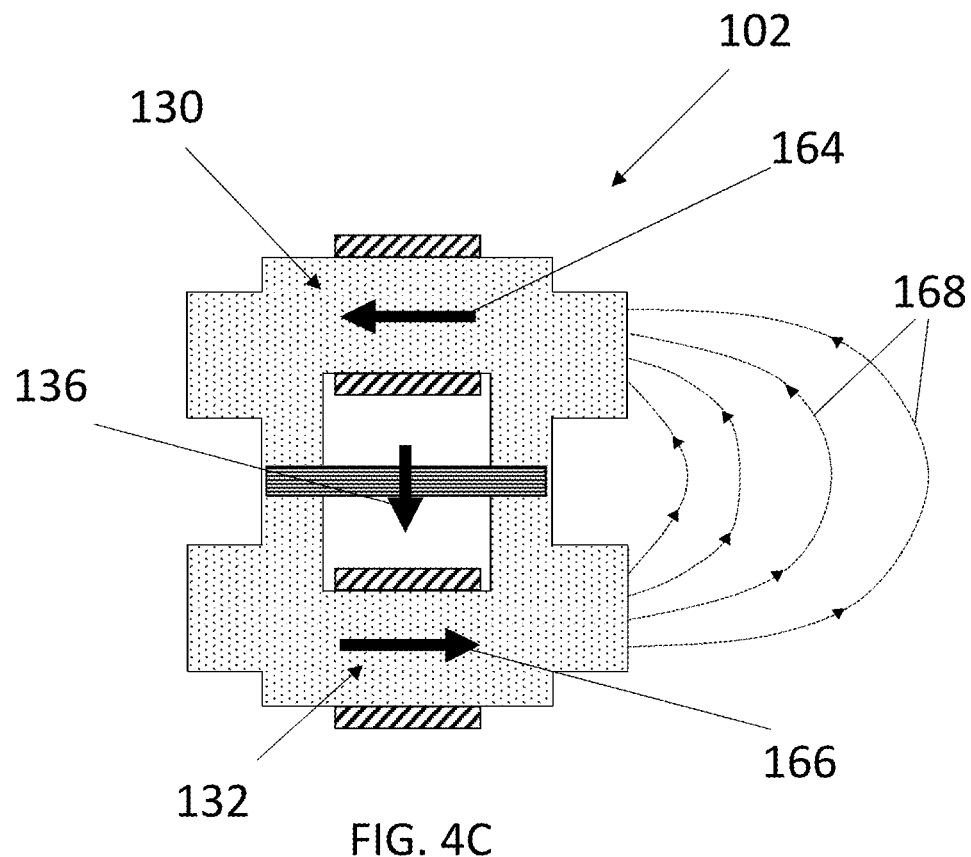
FIG. 4C shows the magnet array of the first example under the application of a reverse current.
Figure 4D:
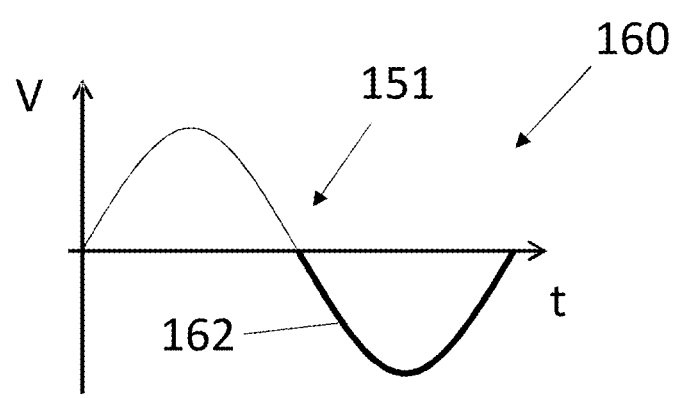
FIG. 4D shows a voltage-time graph representing one cycle of alternating current, indicating the portion of the cycle corresponding to reverse current.

FIG. 4C shows the magnet array 102 during application of reverse current to the electromagnets 130, 132, e.g. such as during the second half of an alternating current cycle. FIG. 4D shows a graph 160 of the variation in voltage against time for one period of the alternating current (151), indicating with a bold line 162 the portion of the cycle where the current is in a reverse direction, i.e. which corresponds to the situation depicted in FIG. 4C.

Referring again to FIG. 4C, the reverse current creates a magnetic field in and around each electromagnet 130, 132, wherein the magnetic orientation of the upper electromagnet 130 is to the left (as shown by the arrow 164) and the magnetic orientation of the lower electromagnet 132 is to the right (as shown by the arrow 166), i.e. the electromagnet orientations are reversed as compared with FIG. 4A. The magnetic orientation of the permanent magnet 134 is downwards (as shown by the arrow 136), i.e. unchanged compared with FIG. 4A.

This arrangement of magnetic orientations will give rise to a resultant magnetic field that extends to the right of the magnet array 102, as shown by the magnetic flux lines 168, while the magnetic field to the left of the magnet array 102 is suppressed to near zero.

Thus it will be understood from FIGS. 4A to 4D that when an alternating current is applied to the electromagnets 130, 132, the magnet array 102 will produce a magnetic field that extends alternately to the left and to the right of the magnet array 102.

FIGS. 5A to 5E show how the alternating field produced by the magnet array 102 during application of an alternating current is used to reset the frictionless safety brake actuator 100 from the first position to the second position.

Figure 5A:
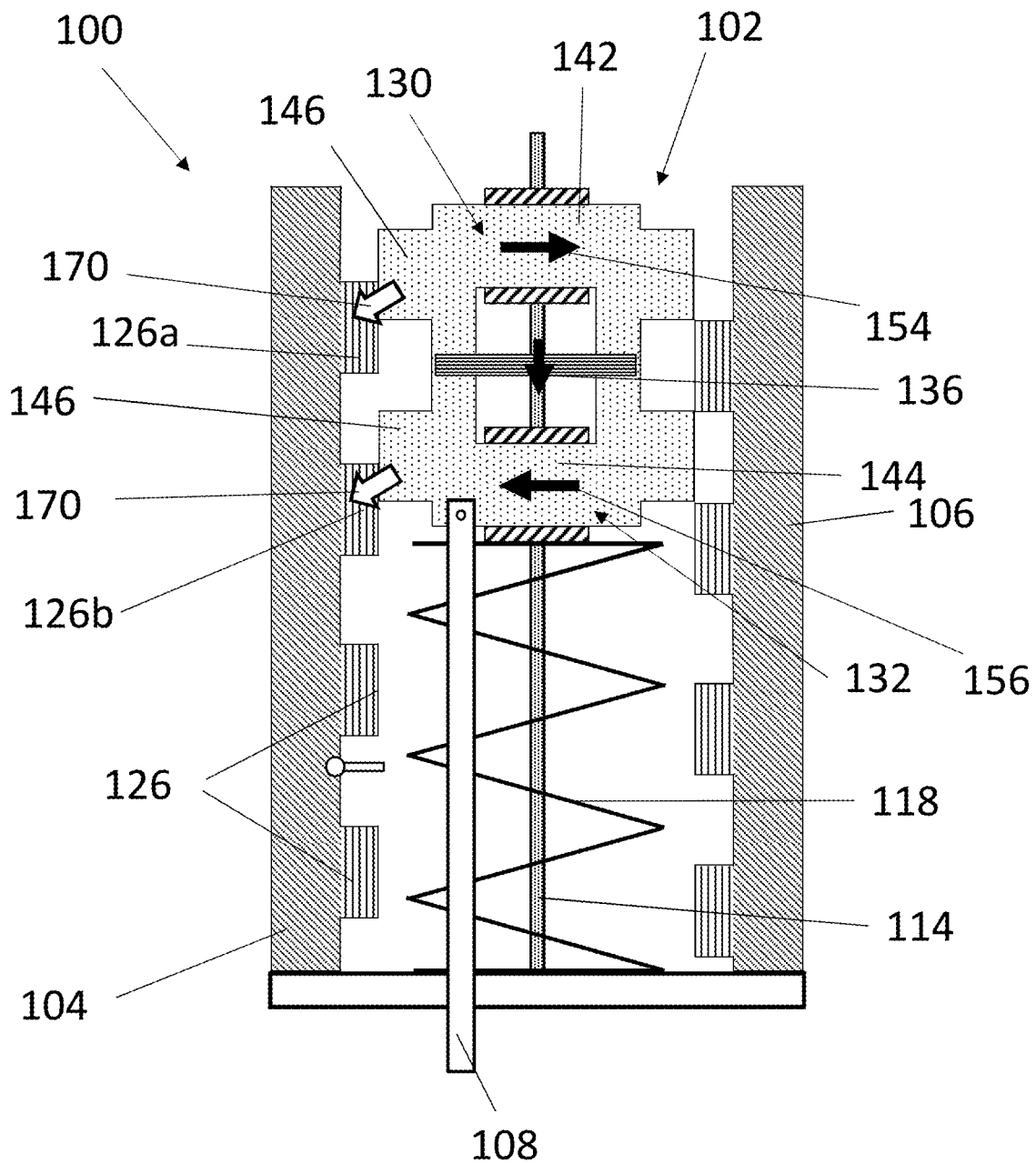
FIGS. 5A to 5C show a series of side views of the frictionless safety brake actuator of the first example as the magnet array moves from a first, actuated position towards a second, non-actuated position under the application of an alternating current to the magnet array.

FIG. 5A shows the frictionless safety brake actuator 100 in the first position, i.e. where the linkage 108 is actuated such that the safety brake is engaged. To reset the frictionless safety brake actuator 100, an alternating current is applied to the electromagnets 130, 132.

FIG. 5A illustrates a moment in time during the first half of a first cycle of the alternating current, i.e. when the current is in the forward direction. As described above with reference to FIGS. 4A to 4D, during application of a forward current to the electromagnets 130, 132, the electromagnets 130, 132 each produce a magnetic field, wherein the magnetic orientation of the upper electromagnet 130 is to the right (as shown by the arrow 154), and the magnetic orientation of the lower electromagnet 132 is to the left (as shown by the arrow 156). This produces a resultant magnetic field that extends to the left of the magnet array 102. The resultant magnetic field causes a magnetic attraction between the magnet array 102 and the teeth 126 of the left stator 104.

As can be seen from FIG. 5A, in the first position, the left protrusions 146 on the electromagnet cores 142, 144 are partially overlapped with two of the teeth 126a, 126b on the left stator 104. The teeth 126a, 126b are slightly lower than the left protrusions 146 on the cores 142, 144. Consequently, the attraction between the electromagnets 130, 132 and the stator teeth 126a, 126b results in a force on the magnet array that acts downwards and to the left, as shown by the arrows 170.

As the guiding element 114 prevents any non-vertical motion of the magnet array 102, the effect of this force is that the magnet array 102 moves downwards, against the biasing force of the spring 118. This moves the magnet array 102 towards the position shown in FIG. 5B.

Figure 5B:
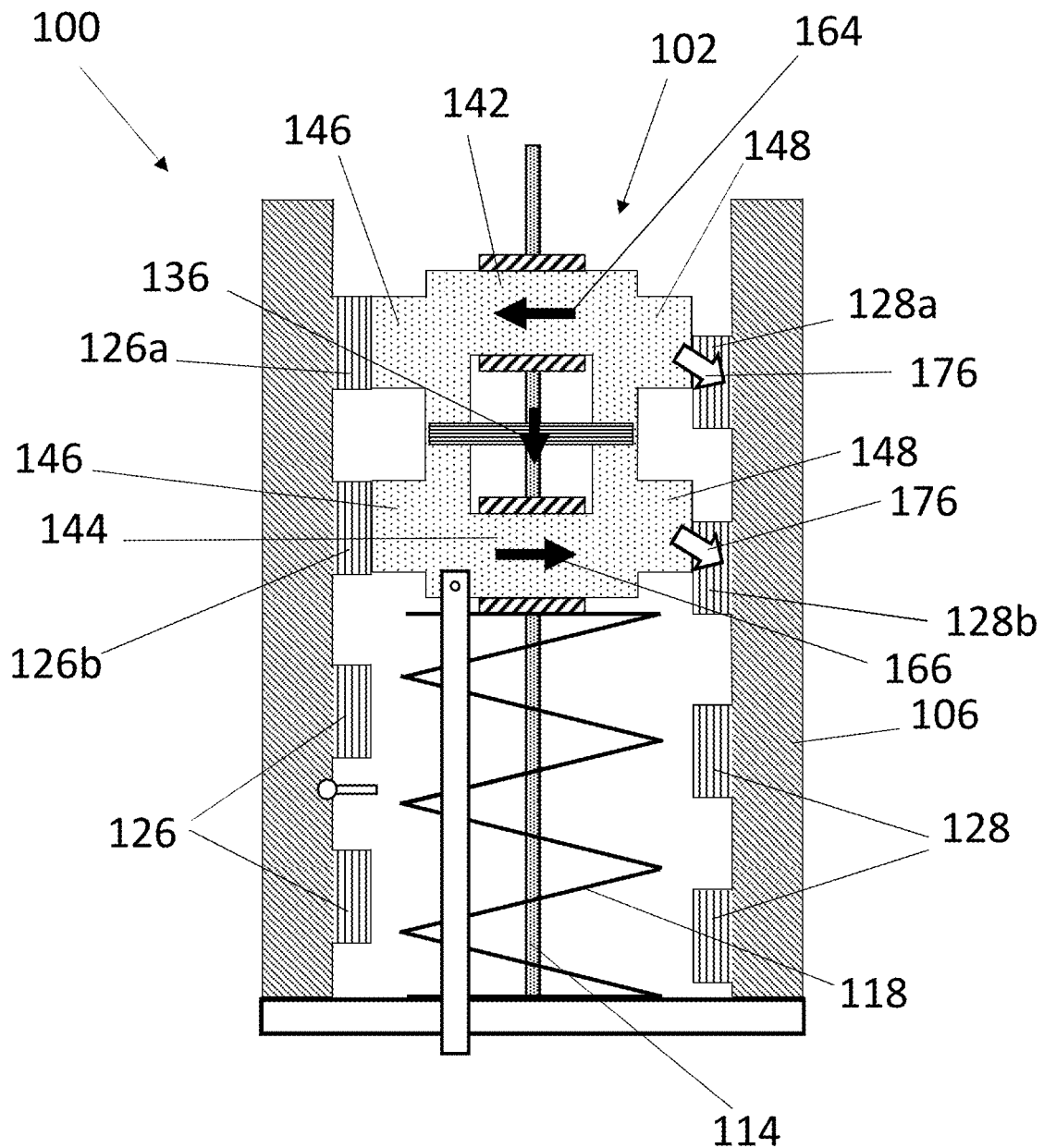

As can be seen in FIG. 5B, the downwards movement of the magnet array 102 has brought the left protrusions 146 on the cores 142, 144 into alignment with the two stator teeth 126a, 126b. The magnet array 102 has also moved relative to the right stator 106. As mentioned above, the teeth 128 of the right stator 106 are displaced vertically downwards by a displacement distance X which is about 25% of the spacing distance S between the stator teeth. Consequently, when the left protrusions 146 on the cores 142, 144 are align with the left stator teeth 126, the right protrusions 148 on the cores 142, 144 are partially overlapped with the teeth 128a, 128b on the right stator 106.

As mentioned above, it is not essential for the displacement distance X of the right stator teeth 128 relative to the left stator teeth 126 to be less than 50% of the spacing distance S. For example, the displacement distance X may be 50% or more than 50% of the spacing distance S. The momentum associated with the downward movement of the magnet array 102 may carry the magnet array 102 past the point where the left core protrusions 146 overlap with the left stator teeth 126, such that the right core protrusions 148 overlap with the right stator teeth 128, even in examples in which the displacement distance X is not less that 50% of the spacing distance S.

However, as mentioned, in the present example, the displacement distance X is less than 50% of S. This helps to ensure that there is at least some overlap of the right core protrusions 148 with the right stator teeth 128, even though the magnet array 102 may not have sufficient momentum to carry it past the point where the left protrusions 146 align with the left stator teeth 126 (e.g. as the magnet array 102 may be accelerated from a stationary state in the first position).

During the movement of the magnet array 102 towards the position shown in FIG. 5B, the alternating current changes direction. FIG. 5B illustrates a moment in time during the second half of the first cycle of the alternating current, i.e. when the current is in the reverse direction. The magnetic orientations of the electromagnets 130, 132 are reversed, such that the upper electromagnet's magnetic orientation is to the left (as shown by the arrow 164) and the lower electromagnet's magnetic orientation is to the right (as shown by the arrow 166). As discussed with reference to FIGS. 4C and 4D, this produces a resultant magnetic field that extends to the right of the magnet array 102. The resultant magnetic field causes a magnetic attraction between the teeth 128 of the right stator 106 and the electromagnets 130, 132.

As mentioned, in the position shown in FIG. 5B, the right protrusions 148 on the electromagnet cores 142, 144 are partially overlapped with two of the teeth 128a, 128b on the right stator 106, and the teeth 128a, 128b are slightly lower than the right protrusions 148 on the cores 142, 144. Consequently, the attraction between the electromagnets 130, 132 and the stator teeth 128a, 128b results in a force on the magnet array that acts downwards and to the right, as shown by the arrows 176.

As the guiding element 114 prevents any non-vertical motion of the magnet array 102, the effect of the force is that the magnet array 102 continues to move downwards against the biasing force of the spring 118. This moves the magnet array 102 towards the position shown in FIG. 5C.

Figure 5C:
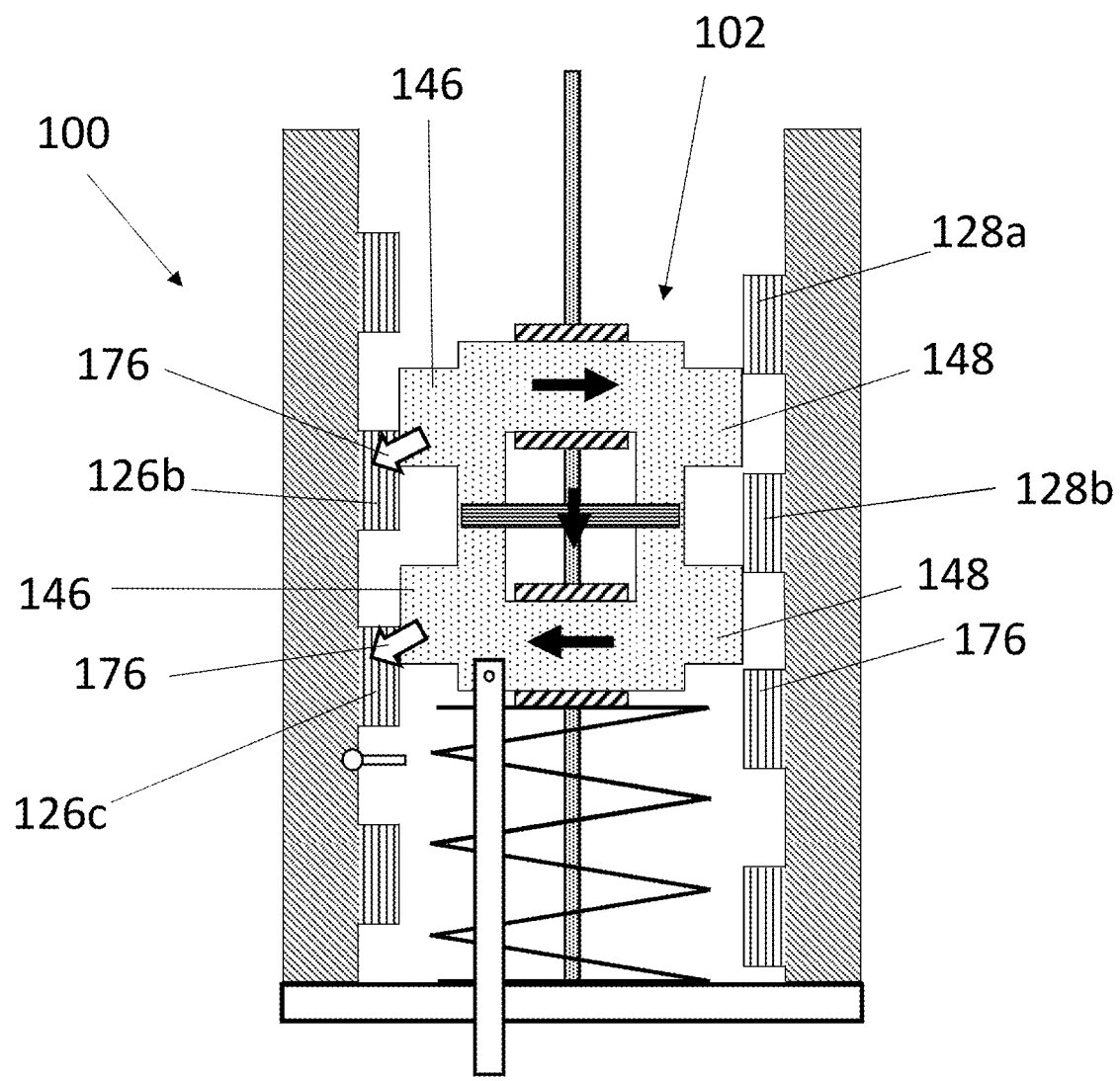

As can be seen from FIG. 5C, the momentum of the magnet array 102 has carried it past the point where the right core protrusions 148 overlap with the right stator teeth 128a, 128b, and the magnet array 102 has reached a position where the left core protrusions 146 have started to overlap with the next pair of left stator teeth 126b, 126c.

During the time that the magnet array 102 is moving from the position in FIG. 5B to the position in FIG. 5C, the current changes direction again. FIG. 5C therefore illustrates a moment in time during the first half of a second cycle of the alternating current. In the same way described above with reference to FIG. 5A, the resultant magnetic field extends to the left of the magnet array 102, creating an attraction between the magnet array and the partially overlapped left stator teeth 126b, 126c (i.e. downwards and to the left, as shown by the arrows 178). This continues the downward movement of the magnet array 102.

Figure 5D:
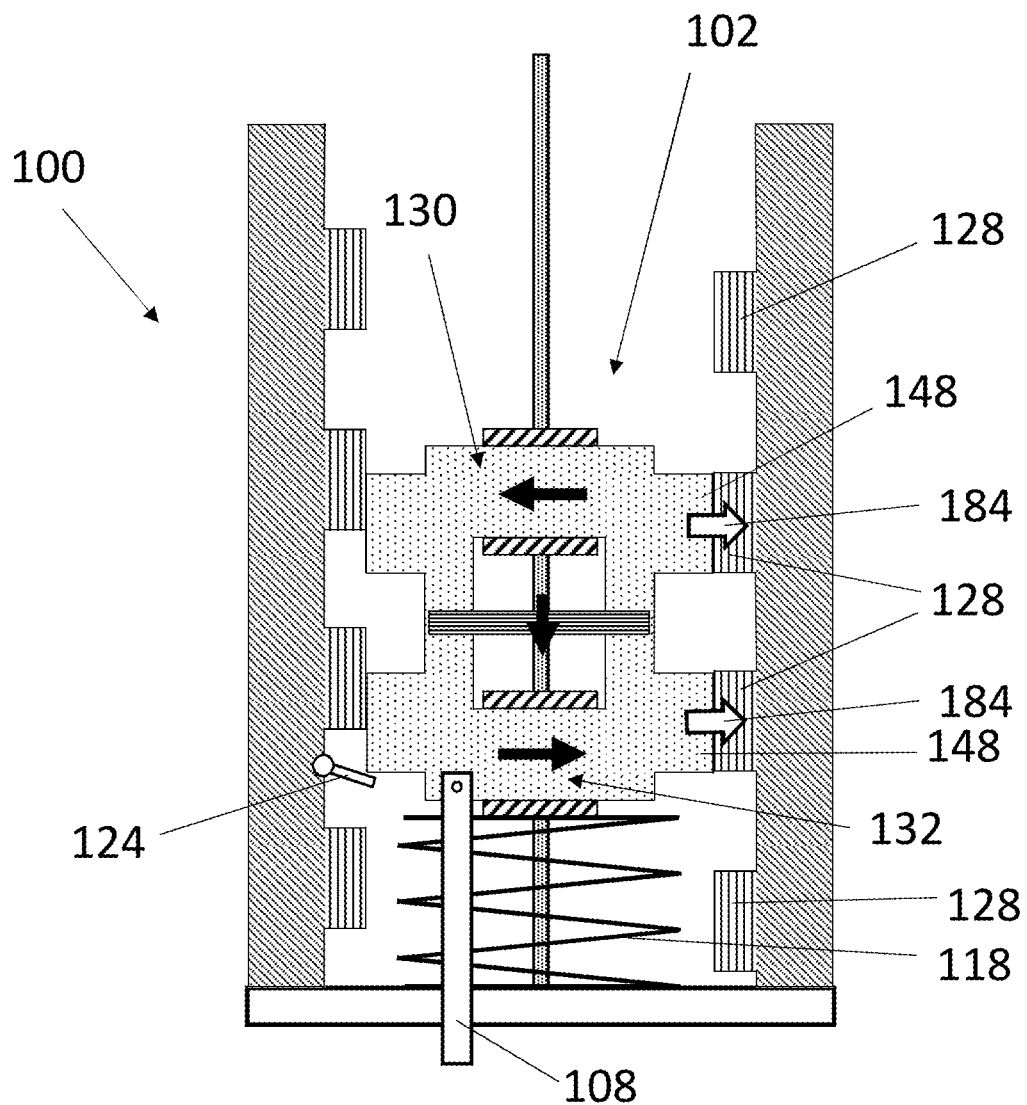
FIG. 5D shows a side view of the frictionless safety brake actuator of the first example retained in the second position by the application a direct current to the magnet array.

The downwards movement of the magnet array 102 continues until it reaches the second position, whereupon it triggers the limit switch 124, as shown in FIG. 5D. The limit switch 124 is depicted in the drawings as a simple mechanical switch for illustrative purposes, but it is to be understood that any suitable switch may be used (e.g. mechanical, electronic, magnetic, optical, etc.) It is also to be understood that for clarity, the frictionless safety brake actuator is shown in the depicted examples with only a few stator teeth between the first and second positions, but in practical implementations there may typically be more teeth between the first and second positions.

The actuation of the limit switch 124 causes a signal to be sent to a controller (e.g. as shown in FIG. 2), indicating that second position has been reached. In response to the signal, the controller discontinues the alternating current and instead applies a direct current to the electromagnets 130, 132. This change in current is illustrated in FIG. 5E.

Figure 5E:
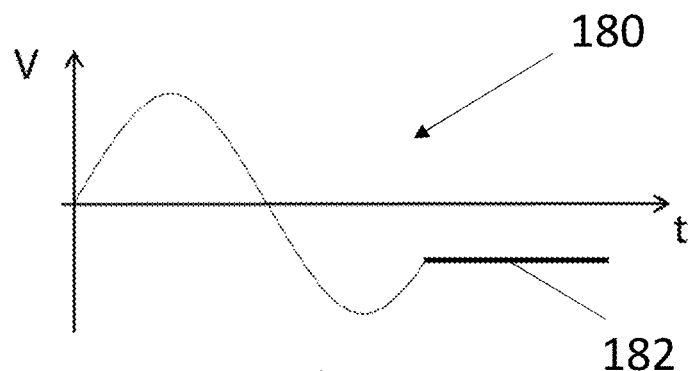
FIG. 5E shows a voltage-time graph representing a partial cycle of alternating current, followed by the application of a direct current.

FIG. 5E shows a graph 180 of a partial cycle of the alternating current supplied to the electromagnets 130, 132 as the magnet array 102 approaches the second position. Partway through the second half of the cycle, the limit switch 124 is triggered, and the alternating current is replaced by a direct current, i.e. a constant voltage as shown by the bold line 182.

In this example, the direct current is in the reverse current direction, so that the resultant magnetic field generated by the magnet array 102 extends to the right. This creates an attractive force (shown by the arrows 184) between the magnet array 102 and two of the right stator teeth 128, which (as can be seen from FIG. 5D) are aligned with the right core protrusions 148 when the magnet array 102 is in the second position. This provides good attraction between the magnet array 102 and the right stator teeth 128, holding the magnet array 102 in the second position against the biasing force of the spring 118.

As mentioned, the linkage 108 is attached to the magnet array 102, so as the magnet array 102 moves towards the second position, it pushes the linkage 108 towards its unactuated position. Once the magnet array 102 has reached the second position, as illustrated in FIG. 5D, the linkage 108 is in its unactuated position and the safety brake has been disengaged. Once the direct current has been applied to hold the magnet array 102 in the second position, the reset of the frictionless safety brake actuator is complete and it ready to be actuated again when the safety brake needs to be applied.

Figure 6:
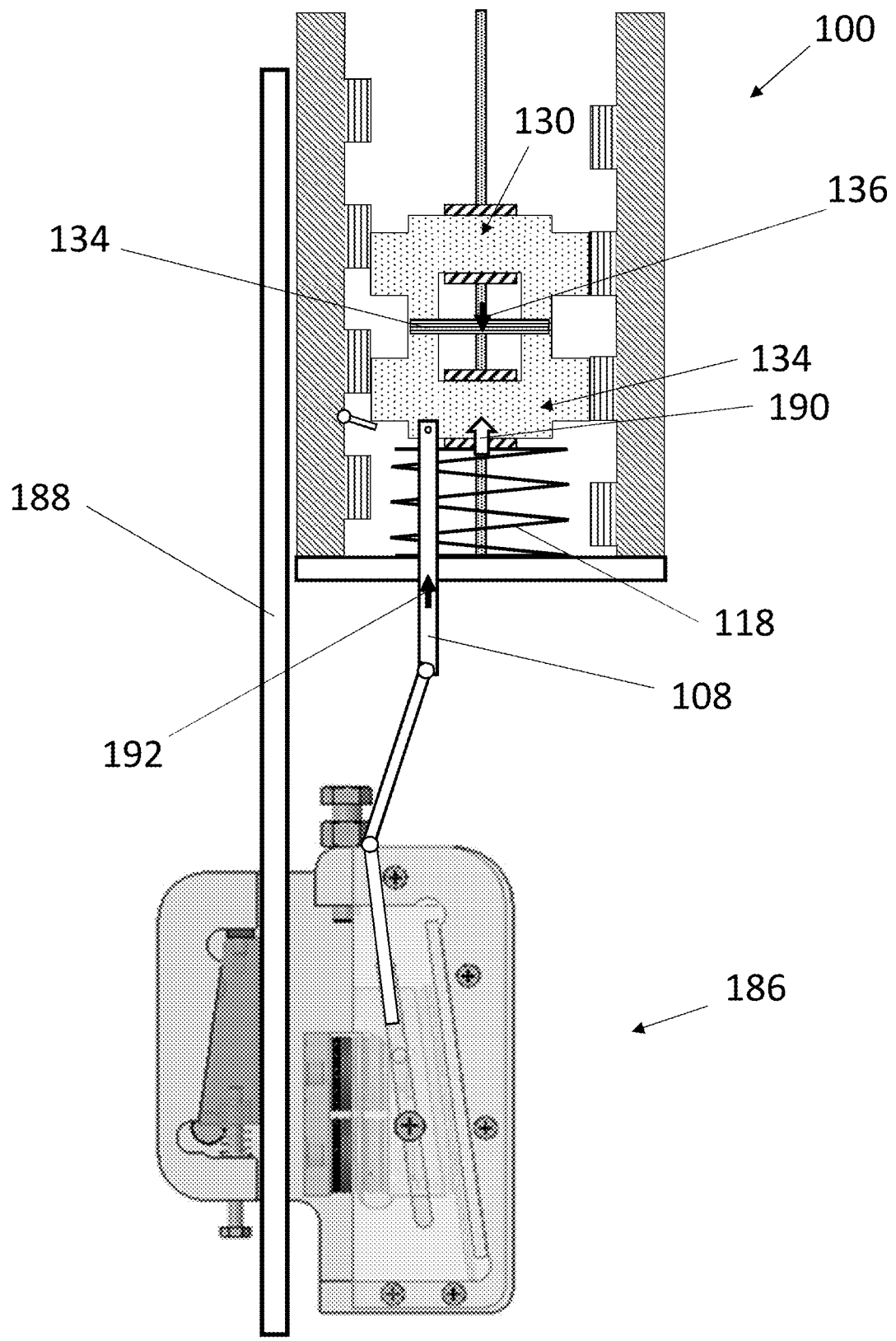
FIG. 6 shows a side view of the frictionless safety brake actuator of the first example during an actuation process.

FIG. 6 shows the frictionless safety brake actuator 100 of FIGS. 3 and 5A to 5D together with a safety brake 186 connected to the frictionless safety brake actuator 100 via the linkage 108. The frictionless safety brake actuator 100 is situated adjacent a guide rail 188 of an elevator system. The frictionless safety brake actuator 100 is positioned above the safety brake, which is in a non-actuated position such that the safety brake is not frictionally engaged with the guide rail.

FIG. 6 illustrates the actuation of the frictionless safety brake actuator 100 to pull up on the linkage 108 and engage the safety brake. In FIG. 6, the frictionless safety brake actuator 100 is in the second position. To actuate the safety brake, the direct current to the electromagnets 130, 132 is discontinued, i.e. so that the electromagnets 130, 132 are turned off and not producing a magnetic field. The permanent magnet 134 still has a magnetic field and a downwards orientation represented by the arrow 136. However, with the electromagnets 130, 132 switched off, the resultant magnetic field of the magnet array 102 is not sufficient to hold the magnet array 102 in the second position against the biasing force of the spring 118.

The magnet array 102 is pushed upwards in the direction of the arrow 190 by the biasing force of the spring 118. The magnet array 102 moves upwards to the first position (i.e.

returning to the position depicted in FIG. 3). As the magnet array 102 moves upwards, it exerts an upward pulling force on the linkage 108 as indicated by the arrow 192. This force is transmitted by the linkage 108 to the safety brake, pulling the safety brake up into frictional engagement with the guide rail.

Figure 7A:
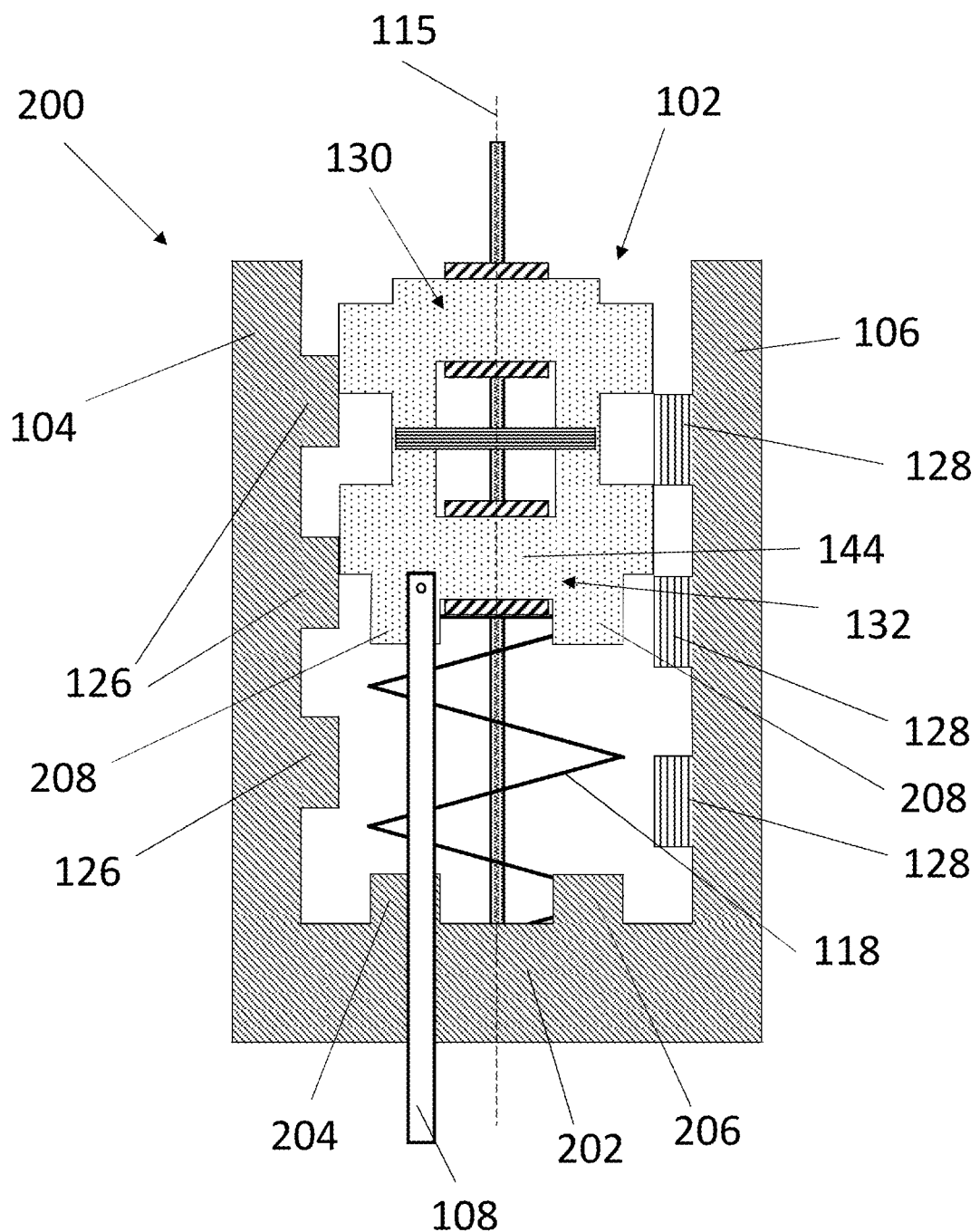
FIG. 7A shows a side view of a second example of a frictionless safety brake actuator in accordance with the present disclosure, wherein the frictionless safety brake actuator is in an actuated state.
Figure 7B:
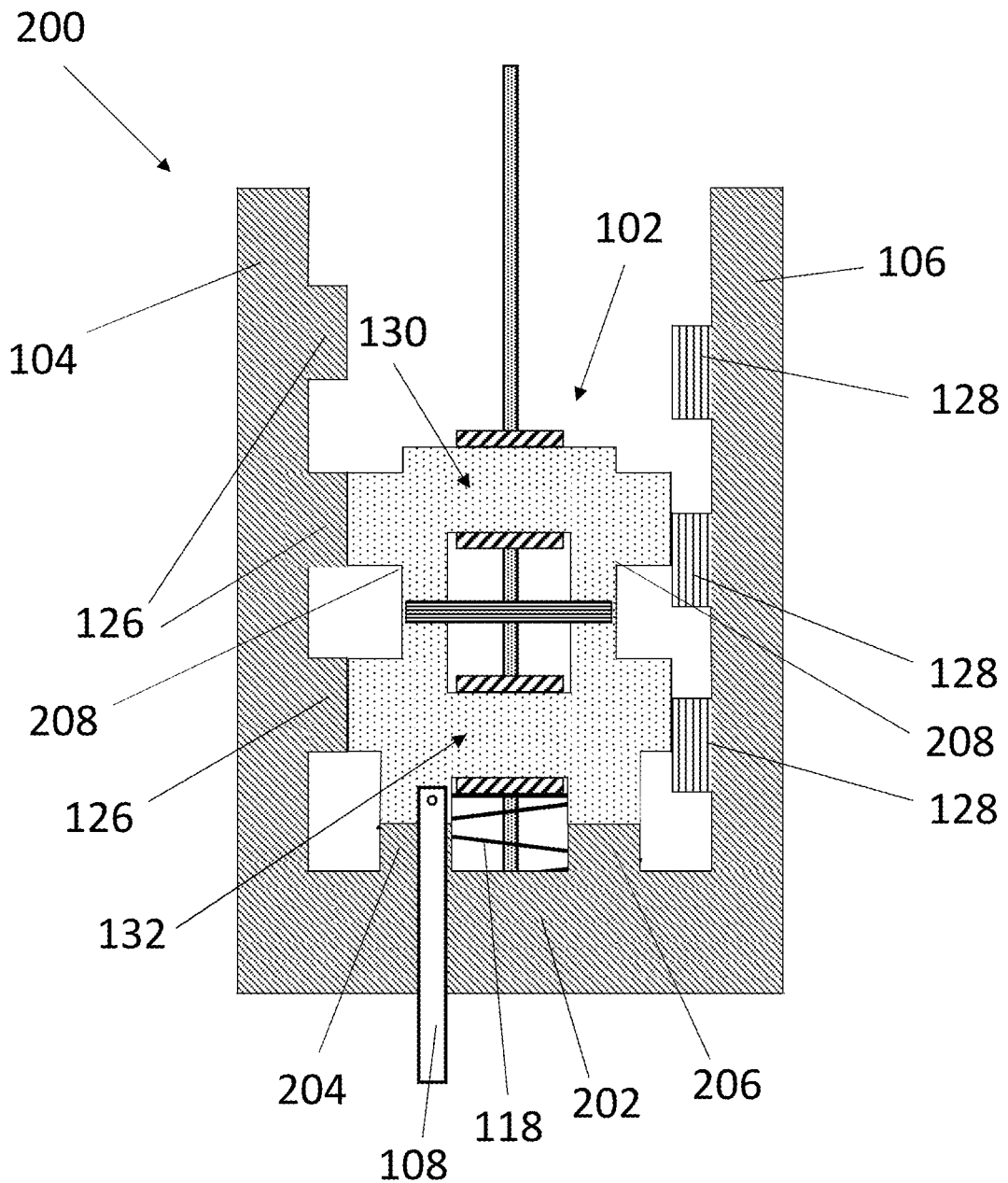
FIG. 7B shows a side view of the frictionless safety brake actuator of the second example in a non-actuated state.

FIGS. 7A and 7B show a second example of a frictionless safety brake actuator 200 in accordance with the present disclosure.

FIG. 7A shows the frictionless safety brake actuator 200 in the first (actuated) position. The frictionless safety brake actuator 200 has the same structure as the example of FIGS. 3, 5A to 5B and 6 (and so the same reference numerals are used to label corresponding features), except that a stop 202 is provided at the bottom of the stators 104, 106 and no limit switch is provided. The stop 202 is made from a magnetic material and has two teeth (a left tooth 204 and a right tooth 206) that protrude upwards. In addition, the core 144 of the lower electromagnet 132 has two lower protrusions 208 that protrude downwards.

To reset the frictionless safety brake actuator 200 (i.e. to move the magnet array 102 from the first position to the second position), an alternating current is applied to the electromagnets 130, 132. The frictionless safety brake actuator 200 operates in the same way as the example of FIGS. 3, 5A to 5B and 6 in respect of the manner in which the magnet array 102 is moved downwards by the application of an alternating current (and so the description of this operation will not be repeated). However, the manner in which the frictionless safety brake actuator 200 stops the movement of the magnet array 102 and retains the magnet array 102 in the second position is different and is described below.

When the frictionless safety brake actuator 200 reaches the second position, as shown in FIG. 7B, the lower protrusions 208 on the lower electromagnet 132 abut the teeth 204, 206 on the stop 202. This prevents the magnet array 102 moving downwards any further, even under the continued application of the alternating current.

While the alternating current is still applied, the resultant magnet field continues to alternative left and right, alternately attracting the teeth 126 of the left stator 104 and the teeth 128 of the right stator 106. In addition, as the stop 202 is magnetic, the magnet array 102 also alternately attracts the left tooth 204 and the right tooth 206. As can be seen from FIG. 7B, the lower protrusions 208 on the magnet array 102 and the teeth 204, 206 on the stop 202 align when the magnet array 102 is in the second position, which help to direct magnetic flux towards the stop teeth 204, 206, enhancing the magnetic attraction between the magnet array 102 and the stop 202. This attraction between the magnet array 102 and the teeth 126, 128 of the stators 104, 106 and of the stop 202 holds the magnet array 102 in the second position against the biasing force of the spring 118.

The alternating current could be maintained to hold the magnet array 102 in the second position. However, in this example, after the magnet array 102 has reached the second position, the alternating current is discontinued and a direct current is applied to the electromagnets 130, 132 instead. This may be more energy efficient than maintaining the alternating current to hold the magnet array 102 in the second position.

It is not important for the alternating current to be changed to direct current at the exact moment that the second position is reached, as the stop 202 prevents the magnet array 102 from moving too far downwards. It is therefore not important to detect the arrival of the magnet array 102 at the second position, e.g. using a limit switch, although a limit switch may still be provided. In this example, the current is switched from alternating current to direct current shortly after the magnet array 102 arrives in the second position.

The direct current causes a resultant magnetic field of the magnet array 102 that attracts the magnet array 102 to some of the teeth 126 of the left stator 104 and the left tooth 204 on the stop 202 (as shown by the arrows 208), holding the magnet array 102 in the second position against the biasing force of the spring 118 until there is a need to engage the safety brake again.

In the examples of FIGS. 3, 5A to 5D, 6 and 7A to 7B, the frictionless safety brake actuators 100, 200 are in each case positioned (or configured to be positioned) above a safety brake so that the safety brake is actuated by the magnet array 102 pulling upwards on the linkage 108. However, frictionless safety brake actuators in accordance with the present disclosure may be used with safety brakes that are actuated by a linkage 108 that is pushed to engage the safety brake.

In some example arrangements that are variations on the examples of FIGS. 3, 5A to 5D, 6 and 7A to 7B, a safety brake that is actuatable by pushing a linkage is provided with an safety brake actuator as depicted in FIGS. 3, 5A to 5D, 6 and 7A to 7B. In the variations, the positions of the frictionless safety brake actuator and the safety brake are swapped as compared with the positions shown in FIGS. 3, 5A to 5D, 6 and 7A to 7B. The magnet array is connected to the linkage of the safety brake so that when the magnet array moves upwards under the biasing force of the spring, it pushes the linkage upwards to engage the safety brake.

It will be appreciated by those skilled in the art that the disclosure has been illustrated by describing one or more specific aspects thereof, but is not limited to these aspects; many variations and modifications are possible, within the scope of the accompanying claims.

What is claimed is:

1. A frictionless safety brake actuator (100; 200) for use in an elevator system (50), comprising:
    at least two stators, including a first stator (104) and a second stator (106) extending in respective substantially parallel planes;
    a magnet array (102) positioned between the first and second stators (104, 106);
    a linkage (108) that is actuatable so as to move a safety brake (58; 186) into frictional engagement with an elevator guide rail (56; 188), wherein the linkage (108) is attached to the magnet array (102), and wherein the magnet array (102) is moveable along an axis (115) extending substantially parallel to the first and second stators (104, 106) between a first position in which the linkage (108) is actuated and a second position in which the linkage (108) is not actuated; and
    a biasing arrangement (118) arranged to apply a biasing force to the magnet array (102) to bias the magnet array (102) towards the first position;
    wherein the magnet array (102) comprises a first magnet set and a second magnet set, wherein the first and second magnet sets comprise at least one magnet each and at least three magnets in total, wherein the magnet(s) (130, 132) of the first magnet set is/are arranged alternately with the magnet(s) (134) of the second magnet set in a stack, wherein the or each magnet in the first magnet set is an electromagnet (130, 132), and wherein the magnet array (102) produces a magnetic field (158, 168);
    wherein the electromagnet(s) (130, 132) in the first magnet set and the magnet(s) (134) in the second magnet set each have a respective orientation (154, 156, 134, 164, 166) such that when a forward current (152) is supplied to the electromagnet(s) (130, 132) in the first magnet set, the magnetic field (158) is stronger on a first side of the magnet array (102) adjacent to the first stator (104) than on a second, opposing side of the magnet array (102) adjacent to the second stator (106), and when a reverse current (162) is supplied to the electromagnet(s) (130, 132) in the first magnet set, the magnetic field (168) is stronger on the second side of the magnet array (102) than on the first side of the magnet array (102);

wherein the first and second stators (104, 106) each comprise a respective array of discrete magnetic elements (126, 128) that extends parallel to the axis (115), wherein the discrete magnetic elements (126, 128) have a staggered configuration in which the discrete magnetic elements (126, 128) on the first stator (104) are displaced in the direction of the axis (115) relative to the discrete magnetic elements (126, 128) on the second stator (106).

2. The frictionless safety brake actuator (100; 200) of claim 1, wherein the respective orientations (154, 156, 134, 164, 166) of the electromagnet(s) (130, 132) of the first magnet set and of the magnet(s) (134) of the second magnet set all lie in a plane that is parallel to the axis (115) and perpendicular to the first and second stators (104, 106);

the first and second magnet sets comprise a total of N magnets arranged in N positions indexed from n=1 to n=N along the axis (115), wherein the electromagnet(s) (130, 132) of the first magnet set and the magnet(s) (134) of the second magnet set are oriented such that, when a forward current (152) is being applied to the electromagnet(s) (130, 132) of the first magnet set, for n=1 to n=N-1, the $(n+1)^{th}$ magnet has an orientation that is rotated by 90° with respect to the orientation of the $n^{th}$ magnet in a first rotational direction, and when a reverse current (162) is being applied to the electromagnet(s) (130, 132) of the first magnet set, for n=1 to n=N-1, $(n+1)^{th}$ magnet has an orientation which is rotated by 90° with respect to the $n^{th}$ magnet in a second rotational direction which is opposite to the first rotational direction.

3. The frictionless safety brake actuator (100; 200) of claim 1, wherein i) the electromagnet(s) (130, 132) of the first magnet set are oriented perpendicular to the axis (115) and the magnet(s) (134) of the second magnet set are oriented parallel to the axis (115); or ii) the electromagnet(s) (130, 132) of the first magnet set are oriented parallel to the axis (115) and the magnet(s) (134) of the second magnet set are oriented perpendicular to the axis (115).

4. The frictionless safety brake actuator (100; 200) of claim 1, wherein the or each magnet in the second magnet set is a permanent magnet (134).

5. The frictionless safety brake actuator (100; 200) of claim 1, wherein the first and second stators (104, 106) are made from a magnetic material, and wherein the arrays of discrete magnetic elements (126, 128) of the first and second stators (104, 106) each comprise a respective array of protrusions of magnetic material that protrude from the respective stator (104, 106) towards the magnet array (102).

6. The frictionless safety brake actuator (100; 200) of claim 1, wherein the discrete magnetic elements (126, 128) of the first and second stators (104, 106) are evenly spaced along the axis (115) with a spacing S, wherein the spacing S is measured between points of adjacent corresponding discrete magnetic elements (126, 128) and wherein S is same for both of the first and second stators (104, 106).

7. The frictionless safety brake actuator (100; 200) of claim 6, wherein the discrete magnetic elements (126, 128) on the first stator (104) are displaced along the axis (115) relative to the discrete magnetic elements (126, 128) on the second stator (106) by a distance X, wherein X is less than 50% of S.

8. The frictionless safety brake actuator (100; 200) of claim 1, further comprising a guiding arrangement (114) extending along or parallel to the axis (115), wherein the guiding arrangement (114) is configured to constrain the magnet array (102) against movement transverse to the axis (115).

9. The frictionless safety brake actuator (100; 200) of claim 1, wherein magnet array (102) comprises a plurality of protrusions (146, 148) arranged to align alternately with one or more of the discrete magnetic elements (126, 128) on the first stator (104) and with one or more of the discrete magnetic elements (126, 128) on the second stator (106) as the magnet array (102) moves towards the second position during application of an alternating current (151) to the electromagnet(s) (130, 132) in the first magnet set.

10. The frictionless safety brake actuator (100) of claim 1, further comprising a limit switch (124) arranged to detect when the magnet array (102) has reached the second position.

11. The frictionless safety brake actuator (200) of claim 1, further comprising a stop arrangement (202) positioned to prevent movement of the magnet array (102) along the axis (115) beyond the second position, wherein the stop arrangement (202) is magnetic.

12. A method of resetting the frictionless safety brake actuator (100; 200) of claim 1, the method comprising:

applying an alternating current (151) to the electromagnet(s) (130, 132) in the first magnet set until the magnet array (102) has moved into the second position.

13. The method of claim 12, further comprising discontinuing the alternating current (151) and applying a direct current (182) to the electromagnet(s) (130, 132) in the first magnet set after the magnet array (102) has reached the second position.

14. The method of claim 13, further comprising detecting, by a or the limit switch (124), that the magnet array (102) has reached the second position, wherein discontinuing the alternating current (151) and applying the direct current (182) to the electromagnet(s) (130, 132) in the first magnet set is performed in response to the limit switch (124) detecting that the magnet array (102) has reached the second position.

15. An elevator system (50) comprising an elevator guide rail, an elevator car, a frictionless safety brake actuator (100; 200) and a safety brake (58; 186), wherein the frictionless safety brake actuator (100; 200) and the safety brake (58; 186) are mounted to the elevator car to move along the guide rail with the elevator car in use; wherein the safety brake actuator (100; 200) comprises:

at least two stators, including a first stator (104) and a second stator (106) extending in respective substantially parallel planes;

a magnet array (102) positioned between the first and second stators (104, 106);

a linkage (108) that is actuatable so as to move the safety brake (58; 186) into frictional engagement with the elevator guide rail, wherein the linkage (108) is attached to the magnet array (102), and wherein the magnet array (102) is moveable along an axis (115) extending substantially parallel to the first and second stators (104, 106) between a first position in which the linkage (108) is actuated and a second position in which the linkage (108) is not actuated; and a biasing arrangement (118) arranged to apply a biasing force to the magnet array (102) to bias the magnet array (102) towards the first position;

wherein the magnet array (102) comprises a first magnet set and a second magnet set, wherein the first and second magnet sets comprise at least one magnet each and at least three magnets in total, wherein the magnet(s) (130, 032) of the first magnet set is/are arranged alternately with the magnet(s) (134) of the second magnet set in a stack, wherein the or each magnet in the first set is an electromagnet (130, 132), and wherein the magnet array (102) produces a magnetic field (158, 168);

wherein the electromagnet(s) (130, 132) in the first magnet set and the magnet(s) (134) in the second magnet set each have a respective orientation (154, 156, 134, 164, 166) such that when a forward current (152) is supplied to the electromagnet(s) (130, 132) in the first magnet set, the magnetic field (158) is stronger on a first side of the magnet array (102) adjacent to the first stator (104) than on a second, opposing side of the magnet array (102) adjacent to the second stator (106), and when a reverse current (162) is supplied to the electromagnet(s) (130, 132) in the first magnet set, the magnetic field (168) is stronger on the second side of the magnet array (102) than on the first side of the magnet array (102);

wherein the first and second stators (104, 106) each comprise a respective array of discrete magnetic elements (126, 128) that extends parallel to the axis (115), wherein the discrete magnetic elements (126, 128) have a staggered configuration in which the discrete magnetic elements (126, 128) on the first stator (104) are displaced in the direction of the axis (115) relative to the discrete magnetic elements (126, 128) on the second stator (106).

* * * * *